(12) United States Patent
Ohta

(10) Patent No.: US 6,763,125 B2
(45) Date of Patent: Jul. 13, 2004

(54) IMAGE RECOGNITION APPARATUS AND IMAGE PROCESSING APPARATUS

(75) Inventor: Akihiro Ohta, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 559 days.

(21) Appl. No.: 09/801,723

(22) Filed: Mar. 9, 2001

(65) Prior Publication Data

US 2002/0159616 A1 Oct. 31, 2002

(51) Int. Cl.$^7$ .............................................. G06K 9/00
(52) U.S. Cl. ..................... 382/104; 302/154; 302/170; 302/194; 302/199; 302/274; 302/286; 340/907; 340/933; 701/117; 701/200
(58) Field of Search ................................. 382/104, 266, 382/106, 209, 154, 165, 199, 194, 219, 274, 286, 162, 170; 340/907, 933, 945, 425.5; 356/602; 348/113, 414.1, 47, 143; 701/200, 117; 359/462, 464, 466; 396/149; 399/344

(56) References Cited

U.S. PATENT DOCUMENTS

| | | | |
|---|---|---|---|
| 5,161,107 A | * 11/1992 | Mayeaux et al. | ........... 701/117 |
| 5,487,116 A | * 1/1996 | Nakano et al. | ............. 382/104 |
| 5,625,717 A | * 4/1997 | Hashimoto et al. | ......... 382/260 |
| 5,678,089 A | * 10/1997 | Bacs et al. | ................... 396/324 |
| 5,801,760 A | * 9/1998 | Uomori | ........................ 348/47 |
| 6,028,672 A | * 2/2000 | Geng | .......................... 356/602 |
| 6,324,001 B2 | * 11/2001 | Tabata | ......................... 359/462 |
| 6,339,375 B1 | * 1/2002 | Hirata et al. | ................. 340/541 |
| 2002/0039438 A1 | * 4/2002 | Mori et al. | .................. 382/154 |

* cited by examiner

Primary Examiner—Timothy M. Johnson
Assistant Examiner—Barry Choobin
(74) Attorney, Agent, or Firm—Wenderoth, Lind & Ponack, L.L.P.

(57) ABSTRACT

In an image recognition apparatus, a left camera and a right camera are provided so as to produce a parallax. A road surface indication recognizing section recognizes road surface indications contained in a left input image that is supplied from the left camera. An edge detecting section detects remaining edges other than the edges of the recognized road surface indications among all the edges in the left input image. A matching section extracts a reference pattern in the left input image that includes a detected edge, and conducts matching between the reference pattern and a right input image that is supplied from the right camera using a pattern matching method. Based on each matching result with the reference pattern, an object recognizing section recognizes an object in the visual fields and determines a distance from the recognized object to the image recognition apparatus.

22 Claims, 15 Drawing Sheets

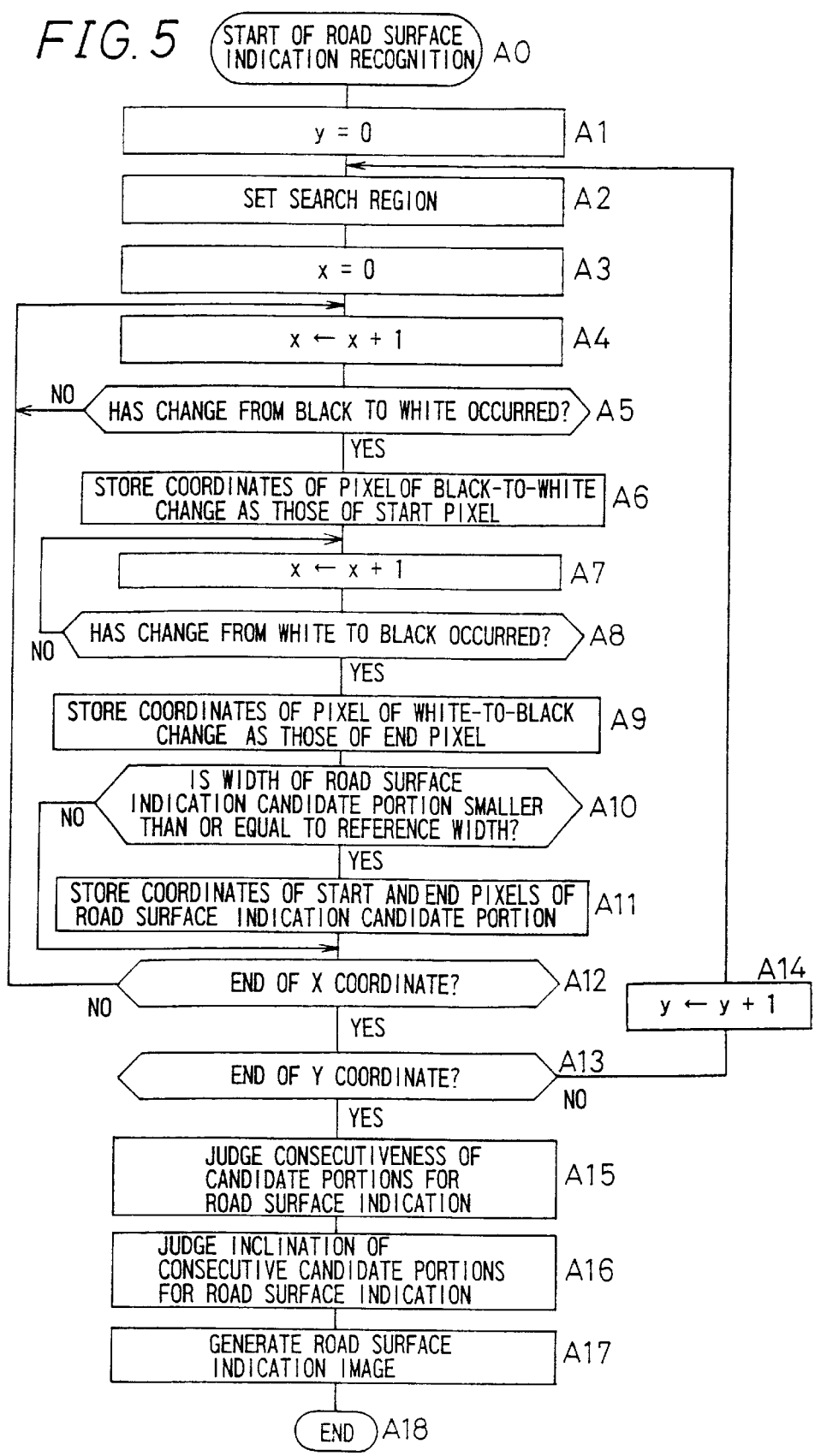

FIG.8A LEFT INPUT IMAGE
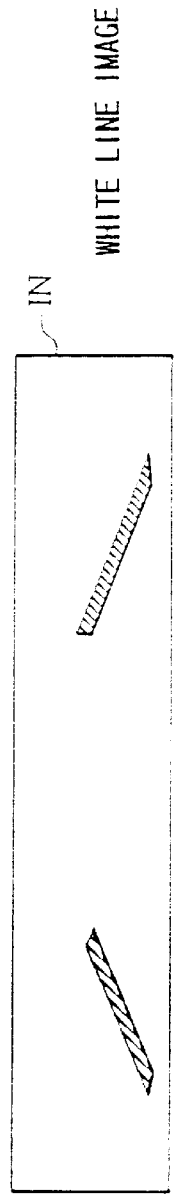
FIG.8C WHITE LINE IMAGE
FIG.8B EDGE IMAGE (CONVENTIONAL)
FIG.8D EDGE IMAGE (AFTER REMOVAL OF WHITE LINES)

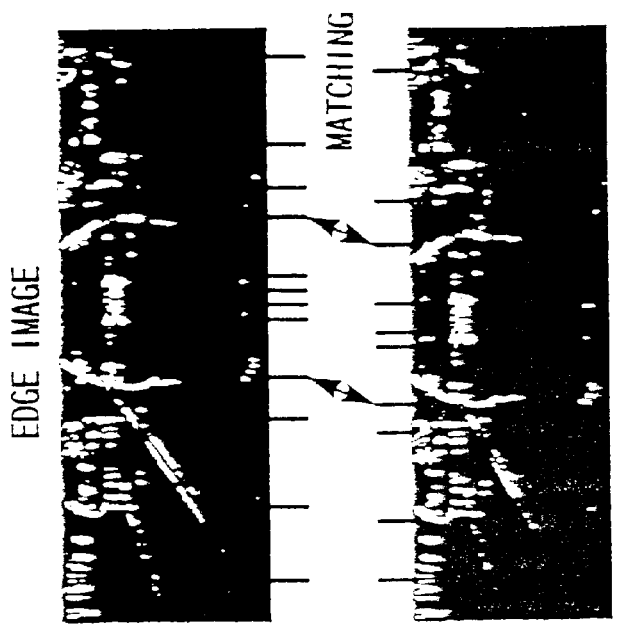
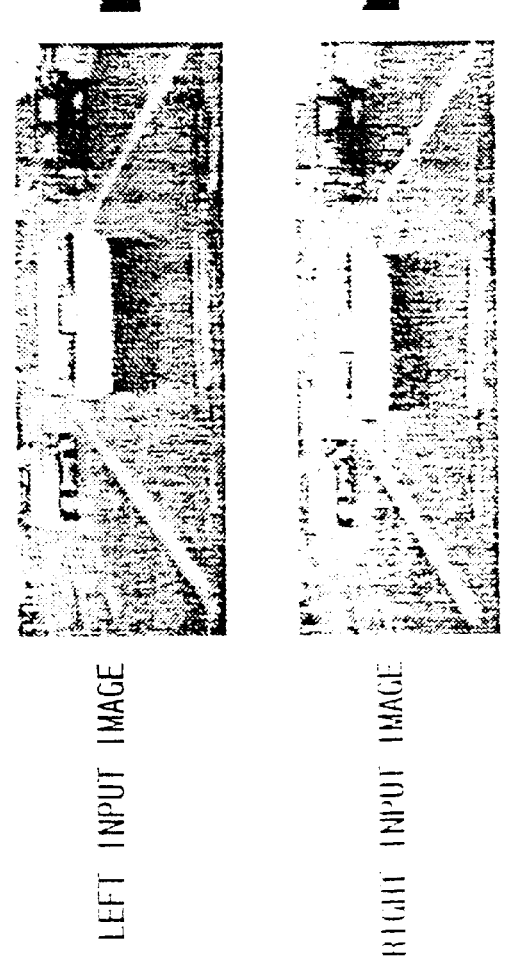
FIG.15A Prior Art
FIG.15B Prior Art
FIG.15C Prior Art
FIG.15D Prior Art

IMAGE RECOGNITION APPARATUS AND IMAGE PROCESSING APPARATUS

BACKGROUND OF THE INVENTION

1. Field of the Invention

The present invention relates to an image recognition apparatus for recognizing objects using the image processing technology and an image processing apparatus for recognizing road surface indications in an image of a road surface.

2. Description of the Related Art

There are vehicles such as automobiles that are equipped with a drive assisting apparatus or an automatic driving apparatus. In many cases, drive assisting apparatuses and automatic driving apparatuses have an image recognition apparatus for recognizing objects ahead of the vehicle. Where an image recognition apparatus performs double-eye ranging using the image processing technology, the image recognition apparatus is equipped with a right camera and a left camera. Provided so that a parallax occurs between images taken, the right camera and the left camera shoot objects in the space ahead of the vehicle. In the image recognition apparatuses, when the left camera and right camera produce a left input image and a right input image shown in FIGS. 15A and 15B, respectively, the position and strength of each longitudinal edge in the right input image and those of each longitudinal edge in the left input image are determined first. As a result, a left edge image shown in FIG. 15C and a right edge image shown in FIG. 15D are obtained. Then, based on the determined position and strength of each longitudinal edge, the left edge image and the right edge image are matched with each other. Parallaxes between images in the left input image and the right input image are obtained as a matching result. The distances between the objects and the vehicle are determined.

In the above conventional double-eye image recognition apparatus having two cameras, longitudinal edges in a left input image and those in a right input image are matched with each other to calculate parallaxes. The matching between the edges often produces errors. Furthermore, since only the longitudinal edges are used, it is difficult to determine a corresponding relationship between lines in a left input image and a right input image that extend obliquely with respect to the longitudinal direction.

Where a left input image and a right input image are obtained by shooting the space ahead of a vehicle that is equipped with the image recognition apparatus, if input images contain a motorcycle or another vehicle that is cutting in ahead, many of the edges of such a vehicle or motorcycle in the input images are oblique lines. Since the conventional double-eye image recognition apparatus has difficulty recognizing a corresponding relationship between oblique lines, it is difficult for the image recognition apparatus to recognize a motorcycle or vehicle that is cutting in ahead of the vehicle that is equipped with the image recognition apparatus.

Where a left input image and a right input image are obtained by shooting the space ahead of a vehicle that is running on a road, the left input image and the right input image contain the surface of the road and road surface indications that are drawn on the road. If there is no object ahead of the left and right cameras, edges of road surface indications are determined in detecting edges in left and right images. The edges of the road surface indications may be recognized erroneously as edges of objects, whereupon object recognition and double-eye ranging are performed. That is, in the conventional double-eye image recognition apparatus, errors frequently occur in object recognition and double-eye ranging when there is no object ahead of the left and right cameras.

SUMMARY OF THE INVENTION

An object of the present invention is to provide an image recognition apparatus capable of stably recognizing an object with a less number of errors as well as recognizing an object having many oblique edges. Another object of the invention is to provide an image processing apparatus capable of reliably recognizing road surface indications in a displayed image of a road surface.

The invention provides an image recognition apparatus comprising:
  first and second cameras provided so as to produce a parallax, for shooting in respective visual fields;
  edge detecting means for detecting edges in a first input image that is supplied from the first camera;
  matching means for extracting, as a reference pattern, a portion in the first input image that includes at least part of a detected edge and for conducting matching of the reference pattern with a second input image that is supplied from the second camera using a pattern matching method; and
  object recognizing means for recognizing an object in the visual fields of the first and second cameras, based on a matching result.

According to the invention, the image recognition apparatus recognizes an object in the visual fields of the first and second cameras, based on a parallax that is indicated by a result of matching between a reference pattern and a second input image. To calculate the parallax of the object, the reference pattern including at least part of an edge of the object in the first input image that is supplied from the first camera is matched with the second input image that is supplied from the second camera by using the pattern matching method. This reduces the possibility of occurrence of errors in the object recognition based on a matching result and enables the object recognition to be performed stably.

The image recognition apparatus of the invention is characterized by further comprising road surface indication recognizing means for recognizing road surface indications contained in at least one input image of the first input image and the second input image, and characterized in that the edge detecting means detects remaining edges other than edges of the road surface indications among all the edges in the first input image, from the first input image, based on a road surface indication recognition result.

According to the invention, road surface indications contained in at least one of the first input image and the second input image are recognized and only remaining edges other than the edges of the road surface indications among all the edges in the first input image are detected. The matching means conducts matching between a reference pattern which is a portion in the first input image that includes at least part of a remaining edge, and the second input image. This prevents the object recognizing means from recognizing road surface indications in recognizing objects in the visual fields. Since the edges of road surface indications in the first input image are removed from the edge detection result of the first input image, the recognition accuracy of objects other than road surface indications in the visual fields is increased.

The image recognition apparatus of the invention is characterized in that the road surface indication recognizing means recognizes only the road surface indications in the first input image.

According to the invention, only the road surface indications in the first input image are recognized prior to the edge detection. Therefore, the image recognition apparatus of the invention can reduce the load of processing of the road surface indication recognizing means as compared with an image recognition apparatus in which road surface indications in both the first input image and the second input image are recognized.

The image recognition apparatus of the invention is characterized in that:

the first camera and the second camera are disposed on a mounting axial line that is parallel with a road surface in the visual field so as to be separated from each other by a predetermined distance, the road surface indication recognizing means:
(1) divides the at least one input image into a plurality of band-like regions extending in a reference direction corresponding to a direction parallel with the mounting axial line in the at least one input image,
(2) on the band-like region basis, carries out a search of a density variation pattern in the reference direction to determine as a candidate portion for a road surface indication, a portion having one end whose density increases according to a predetermined reference increase pattern and another end whose density decreases according to a predetermined reference decrease pattern, and
(3) compares a width of the candidate portion for a road surface indication with a predetermined reference width, and when the width of the candidate portion for a road surface indication is smaller than or equal to the reference width, recognizes that the candidate portion in the at least one input image is part of a road surface indication, and the reference width is predetermined based on the width of a road surface indication that is closest to the first camera and the second camera in a displayed image of a road surface.

According to the invention, the road surface indication recognizing means recognizes that a portion in the at least one input image of the first input image and the second input image is part of a road surface indication, the portion being such that the density increases and decreases according to the predetermined reference increase pattern and reference decrease pattern in the reference direction corresponding to the direction parallel with a road surface and its width in the reference direction is smaller than or equal to the reference width. This allows the road surface indication recognizing means to easily recognize a portion in the input image that is part of a road surface indication, based on only a density variation pattern in the reference direction.

The image recognition apparatus of the invention is characterized in that the reference increase pattern is a density variation pattern of from a density corresponding to black to a density corresponding to white and the reference decrease pattern is a density variation pattern of from the density corresponding to white to the density corresponding to black.

According to the invention, the road surface indication recognizing means regards, as a candidate portion for a road surface indication, a portion in the at least one input image in which in the reference direction the density varies directly from the density corresponding to black to the density corresponding to white, remains the density corresponding to white over a predetermined width or more, and varies directly from the density corresponding to white to the density corresponding to black. This allows the road surface indication recognizing means to easily recognize a portion in the input image that is part of the road surface indication, based on the density variation pattern in the reference direction.

The image recognition apparatus of the invention is characterized in that the reference increase pattern is a density variation pattern of from a density corresponding to black to a density corresponding to white via a density corresponding to gray, and the reference decrease pattern is a density variation pattern of from the density corresponding to white to the density corresponding to black via the density corresponding to gray.

According to the image recognition apparatus, the road surface indication recognizing means regards, as a candidate portion for a road surface indication, a portion in the at least one input image which has in the reference direction a density variation in which the density corresponding to black is varied via the density corresponding to gray to the density corresponding to white, which is maintained over a predetermined width or more, and varied to the density corresponding to black via the density corresponding to gray. This allows the road surface indication recognizing means to easily recognize a portion in the input image that is part of a road surface indication, based on a density variation pattern in the reference direction even if the road surface indication in the visual fields of the first camera and the second camera is blurred or stained.

The image recognition apparatus of the invention is characterized in that the reference increase pattern is a density variation pattern of from a density corresponding to black via a density corresponding to gray to a density corresponding to white, and the reference decrease pattern is a density variation pattern of from a density corresponding to white to a density corresponding to black.

According to the image recognition apparatus, the road surface indication recognizing means regards, as a candidate portion for a road surface indication, a portion in the at least one input image which has in the reference direction a density variation in which the density corresponding to black is varied via the density corresponding to gray to the density corresponding to white, which is maintained over a predetermined width or more, and directly varied to the density corresponding to black. This allows the road surface indication recognizing means to easily recognize a portion in the input image that is part of a road surface indication, based on a density variation pattern in the reference direction even if one side end of the road surface indication in the visual fields of the first camera and the second camera is blurred or stained.

The image recognition apparatus of the invention is characterized in that the reference increase pattern is a density variation pattern of from a density corresponding to black to a density corresponding to white, and the reference decrease pattern is a density variation pattern of from the density corresponding to white to the density corresponding to black via the density corresponding to gray.

According to the image recognition apparatus, the road surface indication recognizing means regards, as a candidate portion for a road surface indication, a portion in the at least one input image which has in the reference direction a density variation in which the density corresponding to black is directly varied to the density corresponding to white, which is maintained over a predetermined width or more, and varied to the density corresponding to black via the density corresponding to gray. This allows the road surface indication recognizing means to easily recognize a portion in the input image that is part of a road surface indication, based on a density variation pattern in the reference direction even if one side end of the road surface indication in the visual fields of the first camera and the second camera is blurred or stained.

The image recognition apparatus of the invention is characterized in that the road surface indication recognizing means further determines a number of candidate portions that have a width smaller than or equal to the reference width and that are arranged consecutively in a direction approximately perpendicular to the reference direction, and when the number of the candidate portions is greater than or equal to a predetermined reference number, recognizes that the candidate portions include parts of an image of a road surface indication in the at least one input image.

According to the invention, the road surface indication recognizing means recognizes that among all the candidate portions for road surface indications in the at least one input image candidate portions whose widths in the reference direction are smaller than or equal to the reference width and that are arranged consecutively in a direction approximately perpendicular to the reference direction in a number greater than or equal to the reference number are a road surface indication. This enables the road surface indication recognizing means to increase the recognition accuracy of road surface indications in the input image.

The image recognition apparatus of the invention is characterized in that the road surface indication recognizing means judges whether an approximately band-like region that consists of the candidate portions that have a width smaller than or equal to the reference width and that are arranged consecutively in the direction approximately perpendicular to the reference direction in the predetermined number or more has an inclination that is within an allowable range that is predetermined based on an inclination of road surface indications in a displayed image of a road surface, and only when the inclination of the approximately band-like region is within the allowable range, recognizes that the candidate portions constituting the approximately band-like region is a road surface indication.

According to the invention, the road surface indication recognizing means recognizes that among all the candidate portions for road surface indications in the at least one input image candidate portions whose widths in the reference direction are smaller than or equal to the reference width and that are arranged consecutively in a direction approximately perpendicular to the reference direction in a number greater than or equal to the reference number are a load surface indication only if the inclination of an approximately band-like region consisting of those candidate portions is within the allowable range. This enables the road surface indication recognizing means to further increase the recognition accuracy of road surface indications in the input image.

The image recognition apparatus of the invention is characterized in that the road surface indication recognizing means searches an entire area of the at least one input image for candidate portions for a road surface indication.

According to the invention, the road surface indication recognizing means searches the entire area of the received at least one input image for candidate portions for a road surface indication. This allows the road surface indication recognizing means to recognize road surface indications in the input image reliably, that is, without failing to recognize part of those.

The image recognition apparatus is characterized in that the road surface indication recognizing means searches, for candidate portions for a road surface indication, a prediction region of the at least one input image where a road surface indication is expected to exist.

According to the invention, the road surface indication recognizing means searches, for candidate portions for a road surface indication, only a prediction region of the received at least one input image where a road surface indication is expected to exist. This reduces the processing load of the road surface indication recognizing means and shortens the time required for the recognition of road surface indications.

The image recognition apparatus of the invention is characterized in that the edge detecting means:

(1) judges, for a pixel basis, whether pixels in the first input image are located outside road surface indication portions therein, based on a road surface indication recognition result; and (2) performs, only to each of pixels in the first input image that are located outside the road surface indication portions therein, a process for judging whether the pixel constitutes an edge in the first input image.

According to the invention, the edge detecting means performs calculation for edge detection on only pixels in the first input image that are located outside road surface indication portions. This enables the edge detecting means to reduce the time required for detection of edges in the first input image other than the edges of road surface indications and to decrease the related processing load.

The image recognition apparatus of the invention is characterized in that the first input image and the second input image each consist of a plurality of pixels, and the matching means conducts matching between the reference pattern and the second input image, using color densities of the respective pixels as indices.

According to the invention, the matching means uses the color densities of the respective pixels as indices in matching the reference pattern with the second input image using the pattern matching method. This allows the matching means to easily conduct matching between the reference pattern and the second input image.

The image recognition apparatus of the invention is characterized in that the matching means corrects, prior to the pattern matching, the densities of the respective pixels of at least one input image of the first input image and the second input image using an offset value commensurate with an individual, color-related difference between the first camera and the second camera.

According to the invention, the matching means performs setting of a reference pattern and matching calculation after correcting at least one input image of the first input image and the second input image in accordance with an individual, color-related difference between the cameras. This enables the matching means to increase the matching accuracy.

The image recognition apparatus of the invention is characterized in that the matching means learns the individual, color-related difference between the first camera and the second camera, based on the first input image and the second input image.

According to the invention, the matching means learns the individual, color-related difference between the cameras and uses the learned individual difference for the correction. This enables the matching means to further increase the matching accuracy when the left camera and the right camera have an individual difference.

The image recognition apparatus of the invention is characterized in that the first input image and the second input image each consist of a plurality of pixels, and the matching means conducts matching between the reference pattern and the second input image, using color density variation amounts of the pixels as indices.

According to the invention, this image recognition apparatus, the matching means uses color density variation amounts of the pixels as indices in matching the reference pattern with the second input image using the pattern matching method. This allows the matching means to easily conduct matching between the reference pattern and the second input image. For example, the color density variation amount of a pixel is the difference between the color densities of two pixels adjacent to each other. Using color density variation amounts of the pixels as indices enables the matching means to increase the matching accuracy.

The image recognition apparatus of the invention is characterized in that the matching means calculates a density difference between minimum and maximum densities of the pixels of the reference pattern and only when the calculated density difference is greater than or equal to a predetermined reference density difference, uses the reference pattern for the pattern matching, the predetermined reference density difference being predetermined based on a minimum density difference of a reference pattern that enables effective matching.

According to the invention, in the reference pattern that is used for the pattern matching, the density difference between the maximum density and the minimum density of all the pixels of the reference pattern is always greater than or equal to the reference density difference. This makes a result of the matching between the reference pattern and the second input image always effective. Since reference patterns whose density differences are smaller than the reference density difference among the extracted reference patterns are not used, no time is consumed to perform unnecessary pattern matching operations. Therefore, the time necessary for the matching of all the reference patterns is shortened.

The image recognition apparatus of the invention is characterized in that the first camera and the second camera are disposed on a predetermined mounting axial line so as to be separated from each other by a predetermined distance, in performing the pattern matching the matching means sets a search region as a subject of a process of the pattern matching in the second input image and compares, with a density distribution of the reference pattern, a density distribution of a portion in the second input image which portion includes at least one pixel of the search region and is congruous with the reference pattern, a width of the search region in a direction that is perpendicular to a reference direction corresponding to a direction parallel with the mounting axial line in the second input image is greater than or equal to three pixels, and a coordinate in the perpendicular direction of a center of the search region in the second input image is the same as a coordinate in the perpendicular direction of a center of the reference pattern in the first input image.

According to the invention, the matching means sets a search region in the second input image. The width of the search region in a direction that is perpendicular to a reference direction that corresponds to a direction parallel with the mounting axial line of the right and left cameras is greater than or equal to a width whose ends in the perpendicular direction are deviated from the pixel of the second input image that corresponds to the central pixel of the reference pattern by several pixels (e.g., one pixel). Where a search region is set, this makes it possible to produce a result of matching between the reference pattern and the second input image without causing an error even if the positional relationship between the optical axes of the first camera and the second camera is deviated from the design positional relationship.

The image recognition apparatus of the invention is characterized in that the first camera and the second camera are disposed on a predetermined mounting axial line so as to be separated from each other by a predetermined distance, in performing the pattern matching the matching means sets a search region as a subject of a process of the pattern matching in the second input image and compares, with a density distribution of the reference pattern, a density distribution of a portion in the second input image which portion includes at least one pixel of the search region and is congruous with the reference pattern, a width of the search region in a reference direction corresponding to a direction parallel with the mounting axial line in the second input image is a width commensurate with an upper limit parallax that is determined based on an arrangement of the first camera and the second camera, and a coordinate in the reference direction of a center of the search region in the second input image is deviated from a coordinate in the reference direction of a center of the reference pattern in the first input image in the same direction as a deviation corresponding to a parallax of the second input image with respect to the first input image.

According to the invention, the matching means sets a search region in the second input image. The search region is elongated with respect to the pixel in the second input image that has the same coordinate as the central pixel of the reference pattern in the first input image only in the direction of a deviation of the second input image with respect to the first input image that corresponds to a parallax. The width of the search region in the reference direction is commensurate with an upper limit parallax in the first input image and the second input image. This makes it possible to minimize the possibility of occurrence of a matching error and shorten the time necessary for the pattern matching.

The image recognition apparatus of the invention is characterized in that in performing the pattern matching the matching means:

(1) selects, one by one, a plurality of detected edges in the first input image in order from an edge having highest edge intensity;

(2) every time an edge is selected, sets, in the first input image, a reference pattern including at least part of the selected edge;

(3) sets, in the second input image, a search region as a processing subject of the pattern matching, based on the position of the set reference pattern in the first input image and a matching result of a reference pattern that has already been processed and the second input image; and (4) compares a density distribution of the set reference pattern and a density distribution of a portion in the second input image that includes at least one pixel of the search region and is congruous with the set reference pattern.

According to the invention, the matching means perform the setting of reference patterns and search regions and the pattern matching calculation on a plurality of edges in descending order of edge intensity. Every time an edge is selected, a search region corresponding to the reference pattern is set in the second input image, based on not only the position of the reference pattern in the first input image but also a result of pattern matching that has already been performed. Since each search region can be made narrower than in a case where each search region is set based on only the position of the corresponding reference pattern in the first input image, the time necessary for the pattern matching can further be shortened.

The invention also provides an image processing apparatus comprising road surface image storing means for storing a displayed image of a road surface; and road surface indication recognizing means for recognizing a displayed portion of a road surface indication in the road surface image, wherein the road surface indication recognizing means (1) divides the road surface image into a plurality of band-like regions extending in a reference direction corresponding to a direction parallel with the road in the image;
(2) on the band-like region basis, carries out a search of density variation pattern in the reference direction to determine as a candidate portion for a road surface indication, a portion having one end whose density increases according to a predetermined reference increase pattern and another end whose density decreases according to a predetermined reference decrease pattern, and
(3) compares a width of the searched candidate portion for a road surface indication with a predetermined reference width, and when the width of the searched candidate portion for a road surface indication is smaller than or equal to the reference width, recognizes that the searched candidate portion is part of a road surface indication, and
the reference width is predetermined based on the width of a road surface indication that is closest to a camera that shot a road surface in a displayed image of the road surface.

According to the invention, the road surface indication recognizing means recognizes that a portion in an image of a road surface is part of a road surface indication, the portion being such that the density increases and decreases according to the predetermined reference increase pattern and reference decrease pattern in the reference direction that corresponds to the direction parallel with the road surface and its width in the reference direction is smaller than or equal to the reference width. This allows the road surface indication recognizing means to easily recognize a road surface indication in a received image, based on only a density variation pattern in the reference direction.

BRIEF DESCRIPTION OF THE DRAWINGS

Other and further objects, features, and advantages of the invention will be more explicit from the following detailed description taken with reference to the drawings wherein:

FIG. 5 is a flowchart showing a first recognition process that is executed by the road surface indication recognizing section 13 of the image recognition apparatus of FIG. 1 to recognize road surface indications;

FIGS. 8A–8D illustrate an edge detection process that is executed by an edge detecting section 15 of the image recognition apparatus of FIG. 1;

FIGS. 15A–15D illustrate double-eye ranging that is performed by a conventional image recognition apparatus.

DETAILED DESCRIPTION OF THE PREFERRED EMBODIMENTS

Figure 1:
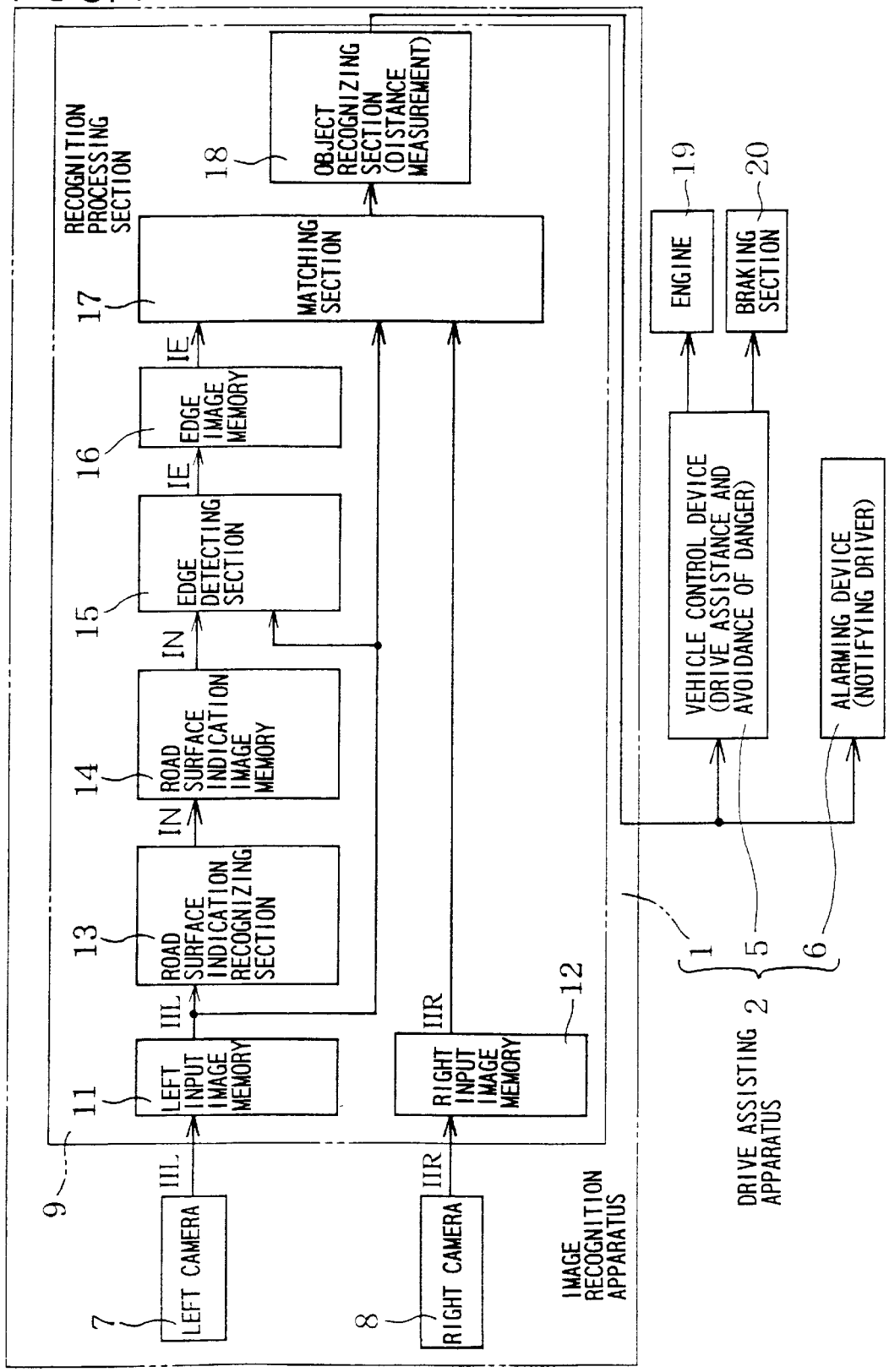
FIG. 1 is a block diagram showing the configuration of a drive assisting apparatus 2 that is equipped with an image recognition apparatus 1 according to an embodiment of the invention.

Now referring to the drawings, preferred embodiments of the invention are described below.

FIG. 1 is a block diagram showing the configuration of a drive assisting apparatus 2 that is equipped with an image recognition apparatus 1 according to an embodiment of the invention. The drive assisting apparatus 2 is provided in a vehicle. A vehicle that is equipped with the drive assisting apparatus 2 will be hereinafter called "self vehicle." The self vehicle is an automobile, for example. The image recognition apparatus 1 recognizes objects around the self vehicle.

Based on the object recognition result of the image recognition apparatus 1, the drive assisting apparatus 2 assists a drive of the self vehicle. The drive assisting apparatus 2 has, in addition to the image recognition apparatus 1, a vehicle control device 5 and an alarming device 6. The image recognition apparatus 1 includes a left camera 7, a right camera 8, and a recognition processing section 9. The recognition processing section 9 includes a left input image memory 11, a right input image memory 12, a road surface indication recognizing section 13, a road surface indication image memory 14, an edge detecting section 15, an edge image memory 16, a matching section 17, and an object recognizing section 18.

The left camera 7 shoots the space in its visual field. Data of a left input image IIL that is obtained by the left camera 7 is stored in the left input image memory 11. The right camera 8 shoots the space in its visual field. Data of a right input image IIR that is obtained by the right camera 8 is stored in the right input image memory 12. The left camera 7 and the right camera 8 are provided in the vehicle so that a parallax occurs for an object in their visual fields. In this embodiment, the left camera 7 is provided on the left of the right camera 8.

The road surface indication recognizing section 13 recognizes road surface indications in a left input image IIL that is supplied from the left camera 7. In this specification, the term "road surface indication" means an indication that is provided on the surface of a road to guide for running of vehicles that run on the road and that assumes a different color from the road surface color in an input image. Road surface indications in the left input image IIL become noise components in recognizing objects in the visual field. A road surface indication recognition result of the left input image IIL is stored in the road surface indication image memory 14.

Referring to the road surface indication recognition result of the left input image IIL, the edge detecting section 15 detects remaining edges, that is, edges other than the road surface indications, among all the edges in the left input image IIL. A detection result of the edges in the left input image IIL is stored in the edge image memory 16. Based on the detection result of the edges in the left input image IIL, the matching section 17 extracts, as a reference pattern, a portion of the left input image IIL that includes at least part of a detected remaining edge. Then, by using a pattern matching method, the matching section 17 conducts matching between the right input image IIR and the reference pattern. A result of the matching between the right input image IIR and the reference pattern has values corresponding to parallaxes of the left camera 7 and the right camera 8 for objects contained in the reference pattern of the left input image IIL.

Based on the matching result, the object recognizing section 18 recognizes objects existing in the visual fields of the left camera 7 and the right camera 8. That is, based on the matching result, the object recognizing section 18 recognizes only objects to be monitored, that is, objects other than the road surface indications, among all the objects existing in the visual fields of both the left camera 7 and the right camera 8. Further, based on the matching result, the object recognizing section 18 determines the distances from the recognized objects to be monitored to the image recognition apparatus 1. In this manner, the image recognition apparatus 1 recognizes the objects to be monitored and performs double-eye ranging thereon. The above-described series of processing steps in the recognition processing section 9 from the recognition of road surface indications in a left input image IIL to the determination of the distances to objects to be monitored is executed every time the left camera 7 and the right camera 8 shoot the spaces in the visual fields of the cameras. The shooting cycle of the left camera 7 and the right camera 8 is 200 m/s, for example.

To assist a drive, the vehicle control device 5 controls an engine 19 and a braking section 20 of the vehicle based on the recognition results of the objects to be monitored in the visual fields of the left camera 7 and the right camera 8 and the distances from the recognized objects to be monitored to the image recognition apparatus 1. Further, using the alarming device 6, the vehicle control device 5 supplies the driver of information relating to drive assistance, based on the recognition result of the objects to be monitored in the visual fields and the distances to the recognized objects.

Each of the left input image memory 11, the right input image memory 12, the road surface indication image memory 14, and the edge image memory 16 is a frame memory. The road surface indication recognizing section 13, the edge detecting section 15, the matching section 17, and the object recognizing section 18 may be individual processing circuits or may be realized by causing a computer to execute programs for computations by the respective processing sections 13, 15, 17, and 18 one after another.

In this specification, the term "road surface indication" includes an indication on a road surface relating to running of vehicles. The indication on a road surface relating to running of vehicles includes the center line of a road, a median strip, each lateral line of a pedestrian crossing, a line of a shoulder of a road, and a character drawn on a road surface. The color of a road surface indication in an input image may be any color as long as it is different from the road surface color. That is, in the specification, the road surface indication is a concept that includes both of a white line on a road and a yellow line on a road. In the specification, the term "objects to be monitored" means objects that exist around a vehicle equipped with the drive assisting apparatus 2 and that exclude the road surface and road surface indications. For example, the object to be monitored is a vehicle running ahead of the self vehicle, a vehicle that is cutting in ahead of the self vehicle from a traffic lane different from the lane of the self vehicle, and a motorcycle existing near the self vehicle.

As described above, the image recognition apparatus 1 recognizes objects in the fields of vision of the left camera 7 and the right camera 8, based on parallaxes of the objects in the fields of vision. To calculate parallaxes of objects, a right input image IIR is matched with a reference pattern that includes at least part of an edge of an object in a left input image IIL. Since a pattern matching method is used in matching calculation, a matching result representing parallaxes of objects in the fields of vision can be obtained without producing errors irrespective of the directions of the edges of objects in a left input image IIL and a right input image IIR. In the image recognition apparatus 1, this decreases errors in recognizing objects in the fields of vision, based on a matching result and makes it possible to recognize the objects in the fields of vision in a stable manner.

In the image recognition apparatus 1, road surface indications in at least the former of a left input image IIL and a right input image IIR are recognized and only remaining edges other than the edges of the road surface indications among all the edges in the left input image IIL are detected. Since the edges of the road surface indications are removed from the detection result of the edges in the left input image IIL, the road surface indications are prevented from being recognized as objects to be monitored in recognizing objects to be monitored in the fields of vision. It is preferable to recognize road surface indications in only the left input image IIL prior to the edge detection. With this measure, the image recognition apparatus 1 according to the embodiment can make the processing load of the road surface recognizing section 13 than an image recognizing apparatus in which road surface indications in both of a left input image IIL and a right input image IIR are recognized.

Figure 2:
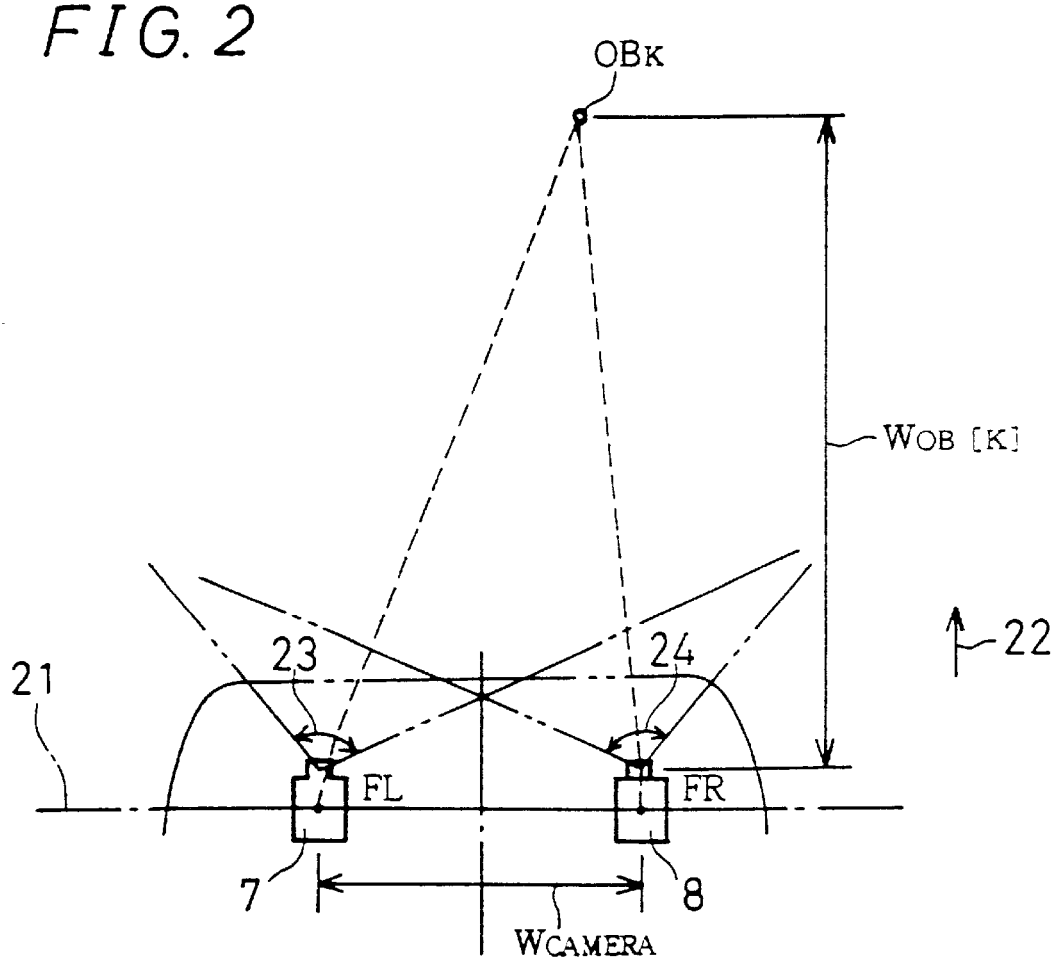
FIG. 2 schematically shows how the left camera 7 and the right camera 8 of the image recognition apparatus 1 are provided in the self vehicle.

A description will now be made of a case where the image recognition apparatus 1 recognizes objects to be monitored that are located ahead of the self vehicle. FIG. 2 schematically shows how the left camera 7 and the right camera 8 are provided, in the self vehicle. The left camera 7 and the right camera 8 are provided on a predetermined mounting axial line 21 with a predetermined distance $W_{CAMERA}$. The camera mounting axial line 21 is approximately parallel with a road surface and approximately perpendicular to a vehicle running direction 22. A visual field 23 of the left camera 7 and a visual field 24 of the right camera 8 include spaces ahead of the self vehicle, respectively. At least part of the visual field 23 of the left camera 7 belongs to the visual field 24 of the right camera 8. With the left camera 7 and the right camera 8 that are arranged as shown in FIG. 2, the image recognition apparatus 1 measure distances $W_{OB[k]}$ from one or more objects $OB_k$ to be measured existing in the visual field 23 of the left camera 7 and the visual field 24 of the right camera 8 to the image recognition apparatus 1.

The left input image IIL is a multi-value image in which a plurality of pixels are arranged in matrix. The X direction of the left input image IIL in which the pixel X coordinate increases corresponds to a reference direction that is approximately parallel with a road surface in the visual fields 23 and 24 of the left and right cameras 7 and 8 and the camera mounting axial line 21. In the left input image IIL, the Y direction in which the pixel Y coordinate increases is perpendicular to the X direction. The pixel-related structure of the right input image IIR is the same as that of the left input image IIL. In the specification, the left input image IIL and the right input image IIR are respectively a 256-gradation monochromatic multi-value image in which pixels are arranged in 120 rows and 512 columns (512×120).

In the recognition processing section 9, an image is handled in the form of digital data representing the image. In the specification, the term "image" includes a concept of "data of an image." The data of an image includes the pixel values of all pixels constituting the image. The pixel value of each pixel of a binary image can take only two gradation levels, and the pixel value of each pixel of a multi-value image can take three or more gradation levels. In the specification, if two images have the same pixel-arrangement-related structure, pixels of the respective images having the same coordinate values in the coordinate system of the images correspond to each other.

A description will now be made of a process that is executed by the road surface indication recognizing section 13 to recognize road surface indications. In the embodiment, the road surface indication recognizing section 13 mainly recognizes road surface indications extending approximately parallel with the depth direction of the visual field of the left camera 7. The depth direction of the visual field of the left camera 7 is approximately perpendicular to the camera mounting axial line 21 and approximately parallel with the optical axis of the left camera 7 and a road surface. When the vehicle is running along a lane of a road, the road surface indication extending approximately parallel with the depth direction of the visual field includes the center line of the road, each longitudinal line of a median strip, each lateral line of a pedestrian crossing, a line of a shoulder of the road, and each longitudinal line of a character drawn on the road surface.

Figure 3:
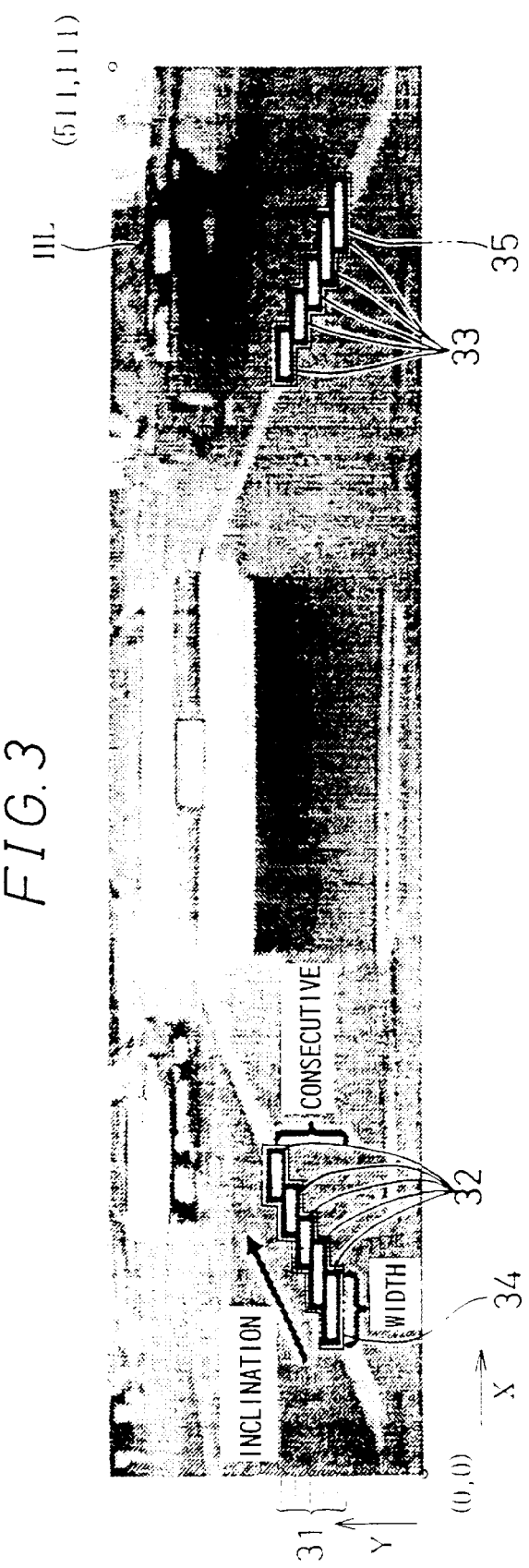
FIG. 3 illustrates a process executed by a road surface indication recognizing section 13 of the image recognition apparatus 1 of FIG. 1 to recognize road surface indications in a left input image IIL.

The process for recognizing road surface indications will be outlined below by using a left input image IIL shown in FIG. 3 as an example. First, the road surface indication recognizing section 13 divides the left input image IIL into a plurality of band-like regions extending in the X direction that is the reference direction. In the embodiment, the left input image IIL is divided on a row-by-row basis in the matrix of the pixels constituting the image, the rows being parallel with the X direction. Then, on a region basis, the road surface indication recognizing section 13 searches for a candidate portion for a road surface indication in the left input image IIL, based on a density value variation pattern in the X direction. The candidate portion for a road surface indication is a portion in a density value variation pattern in the X direction in each region, the portion having, as both ends, a first portion where the density value increases according to a predetermined reference increase pattern and a second portion where the density value decreases according to a predetermined reference decrease pattern. Finally, the road surface indication recognizing section 13 compares the width of the thus-found candidate portion for a road surface indication with a predetermined reference width WAQ that is an upper limit width of a candidate portion. If the width of the thus-found candidate portion is smaller than or equal to the reference width WAQ, the candidate portion in the left input image IIL is recognized as part of a road surface indication. In five rows 31 of the left input image IIL shown in FIG. 3, candidate portions 32 on the left side and candidate portions 33 on the right side are each recognized as part of a road surface indication. In the embodiment, road surface indications extending in the depth direction of the visual field of the left camera 7 are recognized in this manner.

The reference width WAQ of a candidate portion for a road surface indication is predetermined in accordance with the width of a road surface indication that is closest to each of the left camera 7 and the right camera 8 in a standard displayed image of a road surface. Specifically, the reference width WAQ is determined based on the width of band-like road surface indications extending in the depth direction of the visual field, the position of the left camera 7 relative to a road surface, and the resolution of the left input image IIL. It is preferable that the reference width WAQ, which is a width that is larger than or equal to the width of a band-like road surface indication that is closest to the left camera 7 and is contained in the standard displayed image of a road surface, be as close to the width of the road surface indication in the standard image as possible. Where the left input image IIL has a pixel arrangement of 120 rows and 512 columns, the reference width WAQ is set at a width corresponding to 50 pixels.

It is preferable that only when a predetermined reference number or more of candidate portions for a road surface indication each having a width smaller than or equal to the reference width WAQ are arranged consecutively in the Y direction approximately perpendicular to the X direction in a left input image IIL, the road surface indication recognizing section 13 recognize that the consecutive candidate portions are a road surface indication. When a predetermined reference number or more of candidate portions each having a width smaller than or equal to the reference width WAQ are arranged consecutively in the Y direction, it is even preferable that only when the inclination of a generally band-like region consisting of the consecutive candidate portions with respect to the Y direction is within a predetermined allowable range, the road surface indication recognizing section 13 recognize that the consecutive candidate portions are a road surface indication. In the left input image IIL of FIG. 3, two generally band-like regions 34 and 35 on the left side and the right side, respectively, each of which is located on five rows 31 are considered road surface indications.

Figure 4E:
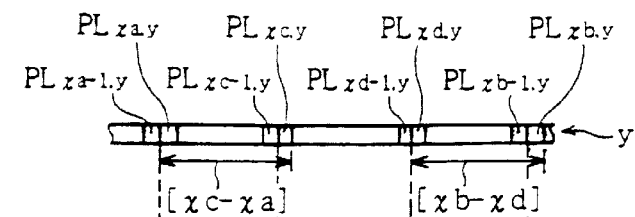
FIGS. 4A–4E are graphs and a schematic diagram illustrating combinations of a reference increase pattern and a reference decrease pattern that are used in the process for recognizing road surface indications in a left input image IIL.

The reference increase pattern that is used for searching for a candidate portion for a road surface indication includes a first reference increase pattern of from a density value corresponding to black to a density value corresponding to white and a second reference increase pattern of from the density value corresponding to black to the density value corresponding to white via a density value corresponding to gray. The reference decrease pattern that is-used for searching for a candidate portion for a road surface indication includes a first reference increase pattern of from the density value corresponding to white to the density value corresponding to black and the second reference decrease pattern of the density value corresponding to white to the density value corresponding to black via the density value corresponding to gray. As shown in FIGS. 4A–4D, there are four kinds of combinations of a reference increase pattern and a reference decrease pattern. Specifically, FIGS. 4A–4D are graphs showing density value variation patterns in the X direction of a candidate portion for a road surface indication on an arbitrary row of a left input image IIL that is shown in an enlarged schematic diagram of FIG. 4E.

Figure 4A:
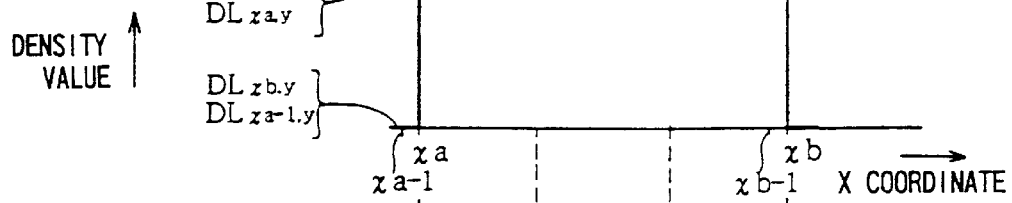

The first combination pattern shown in FIG. 4A is a combination of the first reference increase pattern and the first reference decrease pattern. Where the first combination pattern is used, the road surface indication recognizing section 13 recognizes, as a candidate portion for a road surface indication, a portion on an arbitrary row of the left input image IIL in which in the X direction the density value varies directly from a value corresponding to black to a value corresponding to white, remains there over at least one pixel, and decreases directly from the value corresponding to white to the value corresponding to black. In this manner, the road surface indication recognizing section 13 can easily recognize a road surface indication in a left input image IIL, only based on density value variation patterns in the X direction.

Figure 4B:
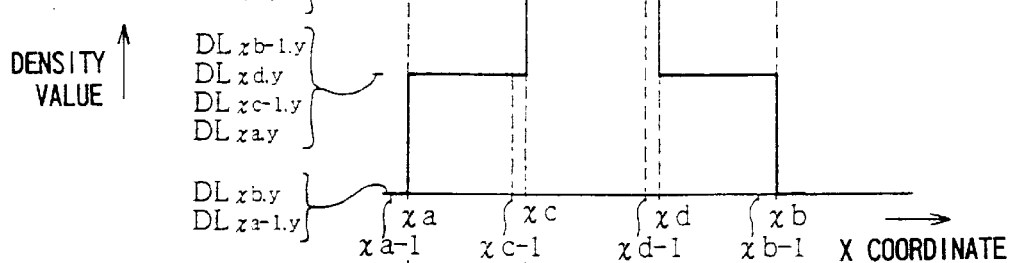

The second combination pattern shown in FIG. 4B is a combination of the second reference increase pattern and the second reference decrease pattern. Where the second combination pattern is used, the road surface indication recognizing section 13 recognizes, as a candidate portion for a road surface indication, a portion on an arbitrary row of the left input image IIL in which in the X direction the density value varies from a value corresponding to black to a value corresponding to white via a value corresponding to gray, remains the value corresponding to white over at least one pixel, and decreases from the value corresponding to white to the value corresponding to black via the value corresponding to gray. In this manner, the road surface indication recognizing section 13 can easily recognize a road surface indication in a left input image IIL, only based on density value variation patterns in the X direction even if the road surface indication in the visual field of the left camera 7 is blurred or stained.

Figure 4C:
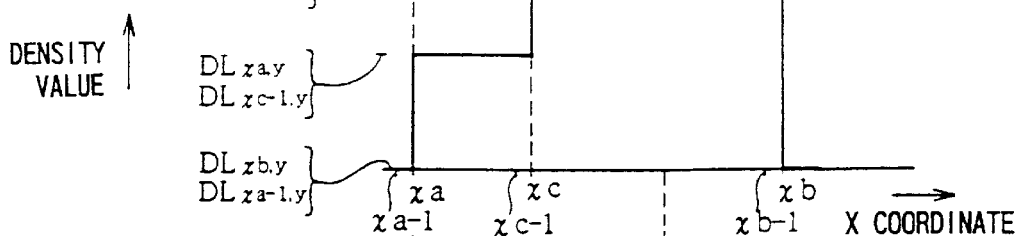
Figure 4D:
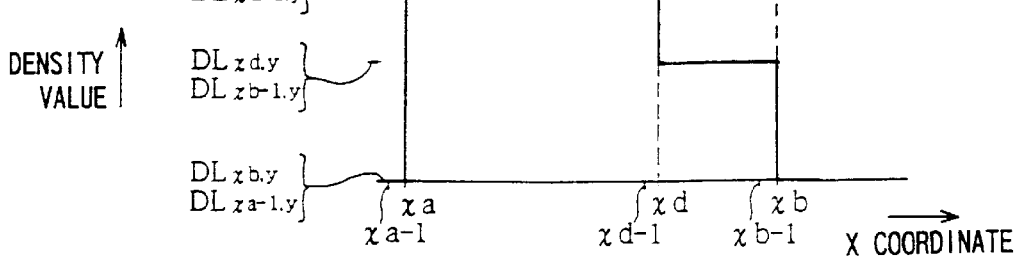

The third combination pattern shown in FIG. 4C is a combination of the second reference increase pattern and the first reference decrease pattern. Where the third combination pattern is used, the road surface indication recognizing section 13 recognizes, as a candidate portion for a road surface indication, a portion on an arbitrary row of the left input image IIL in which in the X direction the density value varies from a value corresponding to black to a value corresponding to white via a value corresponding to gray, remains the value corresponding to white over at least one pixel, and decreases directly from the value corresponding to white to the value corresponding to black. The fourth combination pattern shown in FIG. 4D is a combination of the first reference increase pattern and the second reference decrease pattern. Where the fourth combination pattern is used, the road surface indication recognizing section 13 recognizes, as a candidate portion for a road surface indication, a portion on an arbitrary row of the left input image IIL in which in the X direction the density value varies directly from a value corresponding to black to a value corresponding to white, remains there over at least one pixel, and decreases from the value corresponding to white to the value corresponding to black via a value corresponding to gray. In this manner, where at least one of the third and fourth combination patterns is used, the road surface indication recognizing section 13 can easily recognize a road surface indication in a left input image IIL, only based on density value variation patterns in the X direction even if one side end of the road surface indication in the visual field of the left camera 7 is blurred or stained.

If pixel density values are checked in the X direction on an arbitrary row (yth row) of a left input image IIL, it is preferable that a density value variation pattern of two adjacent pixels $PL_{xa-1, y}$ and $PL_{xa, y}$ be regarded as coincident with the first reference increase pattern only when the conditions of Inequalities (1) are satisfied. The conditions of Inequalities (1) are satisfied when the absolute value of the difference between density values $DL_{xa-1, y}$ and $DL_{xa, y}$ of the two adjacent pixels $PL_{xa-1, y}$ and $PL_{xa, y}$ is greater than or equal to a predetermined reference density value difference $\Delta DC\alpha$ and the density value $DL_{xa-1, y}$ of the start pixel that is the one of the two pixels having a smaller X coordinate is closer to the density value corresponding to black than the density value $DL_{xa, y}$ of the end pixel having a greater X coordinate is. In the specification, y is an arbitrary value that is greater than or equal to the lower limit value and smaller than or equal to the upper limit value of the Y coordinate of the left input image IIL and xa is a value that is greater than or equal to the lower limit value and smaller than or equal to the upper limit value of the X coordinate of the left input image IIL.

$$|DL_{xa-1, y} - DL_{xa, y}| \geq \Delta DC\alpha, \text{ and } DL_{xa-1, y} < DL_{xa, y} \quad (1)$$

If pixel density values are checked in the X direction on an arbitrary row of a left input image IIL, it is preferable that a density value variation pattern of two adjacent pixels $PL_{xb-1, y}$ and $PL_{xb, y}$ be regarded as coincident with the first reference decrease pattern only when the conditions of Inequalities (2) are satisfied. The conditions of Inequalities (2) are satisfied when the absolute value of the difference between density values $DL_{xb-1, y}$ and $DL_{xb, y}$ of the two adjacent pixels $PL_{xb-1, y}$ and $PL_{xb, y}$ is greater than ore equal to a predetermined reference density value difference $\Delta DC\beta$ and the density value $DL_{xb-1, y}$ of the start pixel that is the one of the two pixels having a smaller X coordinate is closer to the density value corresponding to white than the density value $DL_{xb, y}$ of the end pixel having a greater X coordinate is. In the specification, xb is a value that is greater than or equal to the lower limit value and smaller than or equal to the upper limit value of the X coordinate of the left input image IIL.

$$|DL_{xb-1, y} - DL_{xb, y}| \geq \Delta DC\beta, \text{ and } DL_{xb-1, y} > DL_{xb, y} \quad (2)$$

If pixel density values are checked in the X direction on an arbitrary row of a left input image IIL, it is preferable that a density value variation pattern in interval [xa–xc] that satisfies all the conditions of Inequalities (3)–(6) is regarded as coincident with the second reference increase pattern. The conditions of Inequalities (3) are satisfied when at the start position of interval [xc–xa] the absolute value of the difference between a density value $DL_{xa, y}$ of the start pixel $PL_{xa, y}$ and a density value $DL_{xa-1, y}$ of the pixel $PL_{xa-1, y}$ that is outside the interval and adjacent to the start pixel is greater than or equal to a predetermined reference density value difference $\Delta DCa$ and the density value $DL_{xa-1, y}$ of the pixel adjacent to the start pixel is closer to the density value corresponding to black than the density value $DL_{xa, y}$ of the start pixel is. The conditions of Inequalities (4) are satisfied when at the end position of interval [xc–xa] the absolute value of the difference between a density value $DL_{xc, y}$ of the end pixel $PL_{xc, y}$ and a density value $DL_{xc-1, y}$ of the pixel $PL_{xc-1, y}$ that is inside the interval and adjacent to the end pixel is greater than or equal to a predetermined reference density value difference $\Delta DCc$ and the density value $DL_{xc-1, y}$ of the pixel adjacent to the end pixel is closer to the density value corresponding to black than the density value $DL_{xc, y}$ of the end pixel is. The condition of Inequality (5) is satisfied when the distance $|xc-xa|$ in the X direction from the start pixel $PL_{xa, y}$ to the end pixel $PL_{xc, y}$ is greater than or equal to the width of one pixel and smaller than the reference width WAQ for a candidate portion for a road surface indication. The condition of Inequality (6) is satisfied when the difference between the pixel values of two adjacent pixels is always smaller than the reference density value difference $\Delta DCc$ for the end pixel in the range from the start pixel $PL_{xa, y}$ to the pixel $PL_{xc-1, y}$ adjacent to the end pixel. In the specification, xc is a value that is greater than or equal to the above-mentioned X coordinate xa and smaller than or equal to the upper limit value of the X coordinate.

$$|DL_{xa-1, y} - DL_{xa, y}| \geq \Delta DCa, \text{ and } DL_{xa-1, y} < DL_{xa, y} \quad (3)$$

$$|DL_{xc-1, y} - DL_{xc, y}| \geq \Delta DCc, \text{ and } DL_{xc-1, y} < DL_{xc, y} \quad (4)$$

$$1 \leq |xc-xa| < WAQ \quad (5)$$

$$0 \leq |DL_{x-1, y} - DL_{x, y}| < \Delta DCc \ (xa < x \leq xc-1) \quad (6)$$

If pixel density values are checked in the X direction on an arbitrary row of a left input image IIL, it is preferable that a density value variation pattern in interval [xb–xd] that satisfies all the conditions of Inequalities (7)–(10) is regarded as coincident with the second reference decrease pattern. The conditions of Inequalities (7) are satisfied when at the start position of interval [xb–xd] the absolute value of the difference between a density value $DL_{xd, y}$ of the start pixel $PL_{xd, y}$ and a density value $DL_{xd-1, y}$ of the pixel $PL_{xd-1, y}$ that is outside the interval and adjacent to the start pixel is greater than or equal to a predetermined reference density value difference $\Delta DCd$ and the density value $DL_{xd-1, y}$ of the pixel adjacent to the start pixel is closer to the density value corresponding to white than the density value $DL_{xd, y}$ of the start pixel is. The conditions of Inequalities (8) are satisfied when at the end position of interval [xb–xd] the absolute value of the difference between a density value $DL_{xb, y}$ of the end pixel $PL_{xb, y}$ and a density value $DL_{xb-1, y}$ of the pixel $PL_{xb-1, y}$ that is inside the interval and adjacent to the end pixel is greater than or equal to a predetermined reference density value difference $\Delta DCb$ and the density value $DL_{xb-1, y}$ of the pixel adjacent to the end pixel is closer to the density value corresponding to white than the density value $DL_{xb, y}$ of the end pixel is. The condition of Inequality (9) is satisfied when the distance $|xb-xb|$ in the X direction from the start pixel $PL_{xd, y}$ to the end pixel $PL_{xb, y}$ is greater than or equal to the width of one pixel and smaller than the reference width WAQ for a candidate portion for a road surface indication. The condition of Inequality (10) is satisfied when the difference between the pixel values of two adjacent pixels is always smaller than the reference density value difference $\Delta DCb$ for the end pixel in the range from the start pixel $PL_{xd, y}$ to the pixel $PL_{xb-1, y}$ adjacent to the end pixel. In the specification, xd is a value that is greater than or equal to the lower limit value of the X coordinate and smaller than or equal to the above-mentioned X coordinate xb.

$$|DL_{xd-1, y} - DL_{xd, y}| \geq \Delta DCd, \text{ and } DL_{xd-1, y} > DL_{xd, y} \quad (7)$$

$$|DL_{xb-1, y} - DL_{xb, y}| \geq \Delta DCb, \text{ and } DL_{xb-1, y} > DL_{xb, y} \quad (8)$$

$$1 \leq |xb-xd| < WAQ \quad (9)$$

$$0 \leq |DL_{x-1, y} - DL_{x, y}| < \Delta DCb \ (xd < x \leq xb-1) \quad (10)$$

Where the behavior of a density value variation pattern is judged based on a relative variation of the density values of two or more pixels arranged in the X direction in the above-described manner, the influence of variations in the characteristics relating to the object shooting of the left camera 7 and the right camera 8 is removed from the process of searching for a candidate portion for a road surface indication. Where the left input image IIL is a multi-value image of 256 gradations, both of the reference density value difference $\Delta DC\alpha$ for the first reference increase pattern and the reference density value difference $\Delta DC\beta$ for the first reference decrease pattern are of 10 gradations. Where the left input image IIL is a multi-value image of 256 gradations, all of the two reference density value differences $\Delta DCa$ and $\Delta DCc$ for the second reference increase pattern and the two reference density value differences $\Delta DCb$ and $\Delta DCd$ for the second reference decrease pattern are of 8 gradations.

In the combination of FIG. 4A, satisfactory results are obtained if the difference between the density value $DL_{xa, y}$ of the end pixel for the first reference increase pattern and the density value $DL_{xb-1, y}$ of the start pixel for the first reference decrease pattern is greater than or equal to 0 and smaller than the reference density value difference $\Delta DC\alpha$ for the first reference increase pattern and the reference density value difference $\Delta DC\beta$ for the first reference decrease pattern. In the combination of FIG. 4B, satisfactory results are obtained if the difference between the density value $DL_{xc, y}$ of the end pixel for the second reference increase pattern and the density value $DL_{xd-1, y}$ of the pixel adjacent to the start pixel for the second reference decrease pattern is greater than or equal to 0 and smaller than the reference density value differences $\Delta DCa$, $\Delta DCc$, $\Delta DCd$, and $\Delta DCb$ for the second reference increase pattern and the second reference decrease pattern. In the combination of FIG. 4C, satisfactory results are obtained if the difference between the density value $DL_{xc, y}$ of the end pixel for the second reference increase pattern and the density value $DL_{xb-1, y}$ of the start pixel for the first reference decrease pattern is greater than or equal to 0 and smaller than the reference density value differences $\Delta DCa$, $\Delta DCc$, and $\Delta DC\beta$ for the second reference increase pattern and the first reference decrease pattern. In the combination of FIG. 4D, satisfactory results are obtained if the difference between the density value $DL_{xa, y}$ of the end pixel for the first reference increase pattern and the density value $DL_{xd-1, y}$ of the pixel adjacent to the start pixel for the second reference decrease pattern is greater than or equal to 0 and smaller than the reference density value differences $\Delta DC\alpha$, $\Delta DCd$, and $\Delta DCb$ for the first reference increase pattern and the second reference decrease pattern.

The second reference increase pattern is not limited to the two-step, stepwise increase pattern shown in FIGS. 4B and 4C and may be other increase patterns as long as the density value varies from a value corresponding to black to a value corresponding to white via a value corresponding to gray. For example, the second reference increase pattern may be a stepwise increase pattern of three or more steps or a pattern in which the density value increases successively as the X coordinate increases. These second reference decrease pattern is not limited to the two-step, stepwise decrease pattern shown in FIGS. 4B and 4D and may be other decrease patterns as long as the density value varies from a value corresponding to white to a value corresponding to black via a value corresponding to gray. For example, the second reference decrease pattern may be a stepwise decrease pattern of three or more steps or a pattern in which the density value decreases successively as the X coordinate increases. The road surface indication recognizing section 13 searches for candidate portions for road surface indications using at least one of the combination patterns of FIGS. 4A–4D. It is preferable to use as many combination patterns as possible during a search for candidate portions.

FIG. 5 is a flowchart showing a process that is executed by the road surface indication recognizing section 13 to recognize road surface indications in a left input image IIL. The recognition process shown in FIG. 5 is an example in which only the combination pattern of FIG. 4A is used in detecting candidate portions. After the recognition process is started at step A0, the process goes to step A1. At step A1, the road surface indication recognizing section 13 substitutes the lower limit value "0" of the Y coordinate into variable y that represents the Y coordinate of the current subject row.

Steps A2–A12 is a process for searching for candidate portions for road surface indications on a selected subject row of a left input image IIL. The road surface indication recognizing section 13 selects, as a subject row, a row of the left input image IIL whose Y coordinate is equal to the latest value of variable y. At steps A2–A12, the yth row as the subject row is searched for a candidate portion $AQ_y$ whose width in the X direction is smaller than or equal to the reference width WAQ.

At step A2, the road surface indication recognizing section 13 sets, in the subject row, a road surface indication search region that is a subject of the process for searching for candidate portions for road surface indications. The search region may be the entire subject row or part of the subject row where road surface indications are expected to exist. Immediately after the start of the process for searching for candidate portions in the left input image IIL or if no candidate portion whose width is smaller than or equal to the reference width WAQ has been found yet on rows that have already been processed, it is preferable to set the entire subject row as a road surface indication search region. If a candidate portion whose width is smaller than or equal to the reference width WAQ has been found on rows that have already been processed, it is preferable to set, as a road surface indication search region, a prediction region where a road surface indication is expected to exist.

Figure 6:
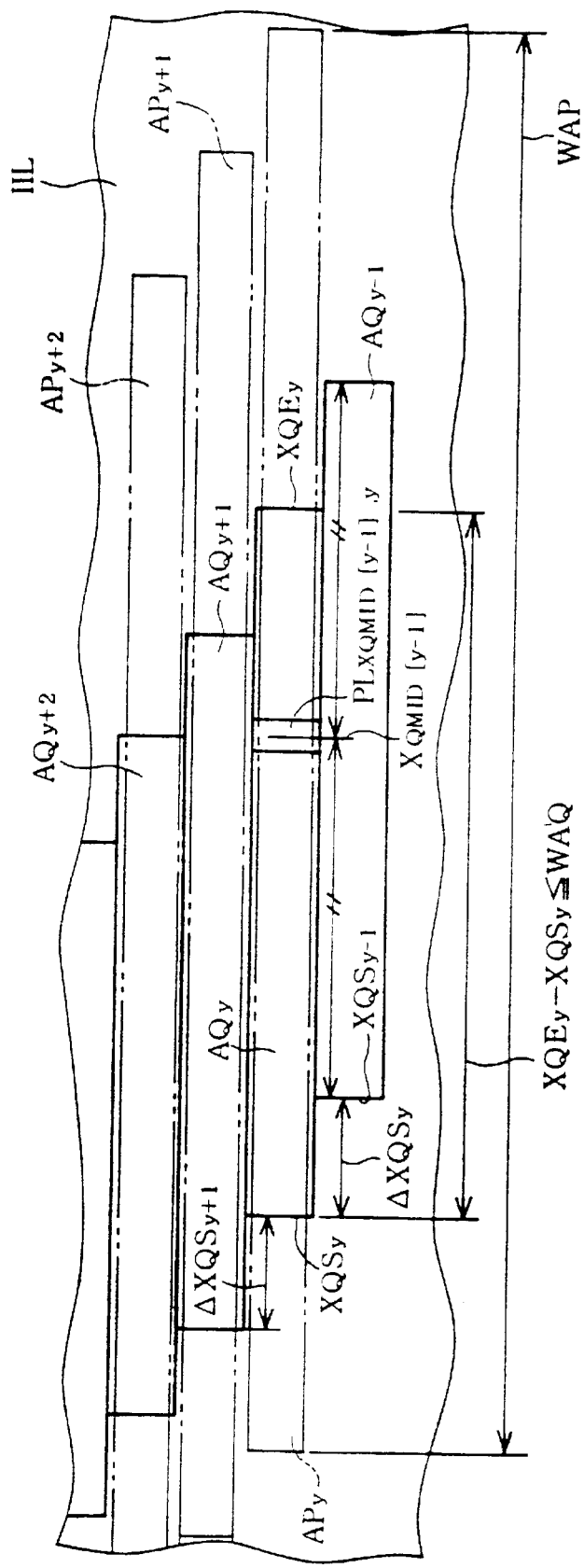
FIG. 6 is an enlarged schematic diagram showing a portion in a left input image IIL where a road surface indication exists.

FIG. 6 is an enlarged schematic diagram showing a portion in a left input image IIL where a road surface indication exists. FIG. 6 shows an example in which the subject row is the yth row of a left input image IIL and a candidate portion $AQ_{y-1}$ whose width is smaller than or equal to the reference width WAQ has already been found on the (y−1)th row. In this case, the road surface indication prediction region $AP_y$ on the yth row is a region on the yth row that has a predetermined width WAP larger than the reference width WAQ and that is centered by a pixel $PL_{X_{QMID[y-1]}, y}$ having an X coordinate $X_{QMID[y-1]}$ and located at the center in the X direction of the candidate portion $AQ_{y-1}$ on the (y−1)th row whose width is smaller than or equal to the reference width WAQ. Where the reference width WAQ for a candidate portion is 50 pixels, the width of a prediction region is set at 200 pixels that is four times the reference width WAQ and 100 pixels are assigned to each of the left side and the right side of the center of the prediction region $AP_y$ in the X direction. If there are two or more candidate portions $AQ_{y-1}$ whose width is smaller than or equal to the reference width WAQ on the (y−1)th row, prediction regions for road surface indications are set on the yth row for the respective candidate portions on the (y−1)th row and all of the two or more prediction regions thus set are employed as road surface indication search regions.

Returning to FIG. 5, at step A3, the road surface indication recognizing section 13 substitutes the X coordinate of the left end of road surface indication search region into variable x that represents the X coordinate of a judgment pixel on the subject row. At step A4, the road surface indication recognizing section 13 updates variable x by adding "1" to it. At step A5, the road surface indication recognizing section 13 selects, as a judgment pixel, a pixel on the subject row that has the same X coordinate as the value of the updated variable x and judges whether the X-direction density value variation pattern in the judgment range from the pixel adjacent to the judgment pixel to the judgment pixel is regarded as the first reference increase pattern in which the density value varies from a value corresponding to black to a value corresponding to white. If it is judged that the X-direction density value variation pattern in the judgment range is different from the first reference increase pattern, the process returns from step A5 to A4. Steps A4 and A5 are repeatedly executed while the judgment pixel is shifted in the X direction by one pixel each time until the X-direction density value variation pattern in the judgment range coincides with the first reference increase pattern. If it is judged that the X-direction density value variation pattern in the judgment range coincides with the first reference increase pattern, the process goes from step A5 to A6. At step A6, the road surface indication recognizing section 13 stores the X and Y coordinates of a pixel on the subject row where the density value varies from a value corresponding to black to a value corresponding to white in a work memory of the road surface indication recognizing section 13 as the X and Y coordinates of the start pixel of a new candidate portion $AQ_y$ (temporary storage).

At step A7, the road surface indication recognizing section 13 updates variable x that represents the X coordinate of the judgment pixel by adding "1" to its current value. At step A8, the road surface indication recognizing section 13 selects, as a judgment pixel, a pixel on the subject row that has the same X coordinate as the value of the updated variable x and judges whether the X-direction density value variation pattern in the judgment range from the pixel adjacent to the judgment pixel to the judgment pixel is regarded as the first reference decrease pattern in which the density value varies from a value corresponding to white to a value corresponding to black. If it is judged that the X-direction density value variation pattern in the judgment range is different from the first reference decrease pattern, the process returns from step A8 to A7. Steps A7 and A8 are repeatedly executed while the judgment pixel is shifted in the X direction by one pixel each time until the X-direction density value variation pattern in the judgment range coincides with the first reference decrease pattern. If it is judged that the X-direction density value variation pattern in the judgment range coincides with the first reference decrease pattern, the process goes from step A8 to A9. At step A9, the road surface indication recognizing section 13 stores the X and Y coordinates of a pixel on the subject row where the density value varies from a value corresponding to white to a value corresponding to black in the work memory of the road surface indication recognizing section 13 as the X and Y coordinates of the end pixel of the new candidate portion $AQ_y$ (temporary storage).

At step A10, the road surface indication recognizing section 13 judges whether the width of the new candidate portion $AQ_y$ in the X direction is greater than 0 and smaller than or equal to the reference width WAQ for a candidate portion (see Inequality (11)). The width of the new candidate portion $AQ_y$ in the X direction is the absolute value of the difference between an X coordinate $XQS_y$ of the start pixel and an X coordinate $XQE_y$ of the end pixel of the candidate portion $AQ_y$. The process goes from step A10 to step A11 only when the width $|XQE_y-XQS_y|$ of the new candidate portion $AQ_y$ in the X direction is smaller than or equal to the reference width WAQ. At step A11, the road surface indication recognizing section 13 stores the X and Y coordinates of the start pixel and the X and Y coordinates of the end pixel of the new candidate portion $AQ_y$ in a candidate portion storage memory of the road surface indication recognizing section 13. After the storing, the process goes from step A11 to step A12. If the width $|XQE_y-XQS_y|$ of the new candidate portion $AQ_y$ in the X direction is greater than the reference width WAQ, the process goes directly from step A10 to step A12.

$$0<|XQE_y-XQS_y|\leq WAQ \quad (11)$$

At step A12, the road surface indication recognizing section 13 judges whether the X coordinate of the current judgment pixel has reached the X coordinate of the end pixel of the road surface indication search region. If the X coordinate of the current judgment pixel is smaller than that of the end pixel of the road surface indication search region, the process returns from step A12 to A4. Steps A4–A12 are repeatedly executed while the judgment pixel is shifted in the X direction by one pixel each time until the X coordinate of the current judgment pixel becomes greater than or equal to that of the end pixel of the search region. If the X coordinate of the current judgment pixel has reached that of the end pixel of the road surface indication search region, the process for searching road surface indication candidate portions on the current subject row is finished and the process goes from step A12 to step A13. As a result of the execution of steps A2–A12, the coordinates of the start pixel and the end pixel of the candidate portion on the row y to be processed whose width in the X direction is smaller than or equal to the reference width WAQ are stored in the candidate portion storage memory.

At step A13, the road surface indication recognizing section 13 judges whether all rows of the left input image IIL have been subjected to the candidate portion search process. If variable y that represents the Y coordinate of the current subject row is not equal to the upper limit value "111" of the Y coordinate of the left input image IIL, there should remain a row(s) that has not been subjected to the candidate portion search process yet. Therefore, the process goes from step A13 to A14. At step A14, the road surface indication recognizing section 13 updates variable y that represents the Y coordinate of the subject row by adding "1" to its current value. After the updating, the process returns from step A14 to step A2. Steps A2–A14 are repeatedly executed while the subject row is shifted in the Y direction by one row each time until all rows of the left input image IIL are subjected to the candidate portion search process. If it is judged that all rows of the left input image IIL have been subjected to the candidate portion search process, the process goes from step A13 to step A15.

At step A15, the road surface indication recognizing section 13 searches the left input image IIL for a region where candidate portions whose width in the X direction is smaller than equal to the reference width WAQ are arranged consecutively in the Y direction. Candidate portions $AQ_y$ and $AQ_{y-1}$ on two adjacent rows are judged consecutive if the condition of Inequality (12) is satisfied. The condition of Inequality (12) is satisfied when the absolute value of a difference $\Delta XQS_y$ of the X coordinates of the start pixels of candidate portions $AQ_y$ and $AQ_{y-1}$ on two adjacent rows (see Inequality (13)) is greater than or equal to 0 and smaller than or equal to an upper limit deviation width $W_{XQSMAX}$. Satisfactory results are obtained if the upper limit deviation width $W_{XQSMAX}$ is greater than 0 and smaller than the reference width WAQ for a candidate portion. In view of a standard inclination of road surface indications in a left input image IIL, it is preferable that the upper limit deviation width $W_{XQSMAX}$ be set equal to 1/5 of the reference width WAQ for a candidate portion. Where the reference width WAQ for a candidate portion is 50 pixels, the preferable upper limit deviation width $W_{XQSMAX}$ is 10 pixels. Where three or more candidate portions are judged consecutive in the Y direction if every adjacent pair of those candidate portions satisfies the condition of Inequality (12).

$$0\leq|\Delta XQS_y|\leq W_{XQSMAX} \quad (12)$$

$$\Delta XQS_y=XQS_y-XQS_{y-1} \quad (13)$$

If a region where candidate portions whose width is smaller than or equal to the reference width WAQ are arranged consecutively in the Y direction is found, the road surface indication recognizing section 13 determines the number of candidate portions in the approximately band-like region thus obtained and judges whether the determined number is greater than or equal to a reference number NLC. Only approximately band-like regions consisting of a reference number or more of candidate portions are left as subjects of the following process. Data of candidate portion that are arranged consecutively over only rows of a number that is smaller than the reference number NLC are removed from the candidate portion storage memory, for example. For example, the reference number NLC for candidate portions that are arranged consecutively in the Y direction is set in accordance with the number of rows over which a single road surface indication exists in a standard displayed image of a road surface. The reference number NLC is set greater than or equal to the minimum number of rows over which a single road surface indication exists in a standard displayed image of a road surface. It is preferable that the reference number NLC be as close to the minimum number as possible. Where the pixel arrangement of the left input image IIL is 120 rows and 512 columns, it is preferable that the reference number NLC be set equal to 10.

At step A16, the road surface indication recognizing section 13 judges whether the inclination of the approximately band-like region consisting of a reference number NLC or more of candidate portions that are arranged consecutively in the Y direction and whose width is smaller than or equal to the reference width WAQ is within a predetermined allowable range. For example, the inclination of the approximately band-like region is judged within the allowable range if every candidate portion of the approximately band-like region satisfies the condition of Inequality (14). For a candidate portion $AQ_y$ on a yth row in the approximately band-like region, the condition of Inequality (14) is satisfied if the absolute value of the difference between a difference $\Delta XQS_y$ between the X coordinates of the start pixels of the candidate portions $AQ_{y-1}$ and $AQ_y$ on the (y−1)th row and the yth row and a difference $\Delta XQS_{y+1}$ between the X coordinates of the start pixels of the candidate portions $AQ_y$ and $AQ_{y+1}$ on the yth row and the (y+1)th row is smaller than or equal to an upper limit width $W\Delta_{XQS}$.

$$0 \leq |\Delta XQS_{y+1} - \Delta QS_y| \leq W\Delta_{XQS} \qquad (14)$$

The allowable range is set based on a standard inclination of road surface indications in a displayed image of a road surface. Where the left camera 7 uses a wide-angle lens, the allowable range is set also in consideration of a variation of the standard inclination of road surface indications in a left input image IIL that is caused by the wide-angle lens. Where the reference width WAQ for a road surface indication candidate portion is 50 pixels and the upper limit deviation width $W_{XQSMAX}$ that is used in judging the consecutiveness of candidate portions is 10 pixels, it is preferable that the upper limit width $W\Delta_{XQS}$ that is used in the inclination judgment be set at one pixel. It is recognized that in the left input image IIL the candidate portions in only an approximately band-like region whose inclination is within the allowable range correspond to a road surface indication. Data of the candidate portions in an approximately band-like region whose inclination is smaller than the lower limit value of the allowable range or greater than its upper limit value are removed from the candidate portion storage memory, for example.

At step A17, based on a result of the road surface indication recognition process of steps A2–A16, the road surface indication recognizing section 13 generates data of a road surface indication image IN that reflects a result of the recognition of road surface indications in the left input image IIL. The road surface indication image IN is a monochromatic binary image in which the pixel value of each pixel is determined based on the result of the recognition of road surface indications. The pixel arrangement of the road surface indication image IN is the same as that of the left input image IIL. If the pixel of the left input image IIL corresponding to an arbitrary pixel of the road surface indication image IN is located within a road surface indication portion in the left input image IIL, the pixel value of the above pixel of the road surface indication image IN is set at one of "0" and "1." If the pixel of the left input image IIL corresponding to an arbitrary pixel of the road surface indication image IN is not located within any road surface indication portion in the left input image IIL, the pixel value of the above pixel of the road surface indication image IN is set at the other of "0" and "1." In the specification, the pixel value of each pixel of the road surface indication image IN that corresponds to a pixel constituting a road surface indication portion in the left input image IIL is set at "0." The road surface indication image IN thus generated is stored in the road surface indication image memory 14 as the result of the recognition of road surface indications in the left input image IIL. After the storing of the road surface indication image IN, the execution of the process shown by the flowchart of FIG. 5 is finished at step A18.

Figure 7:
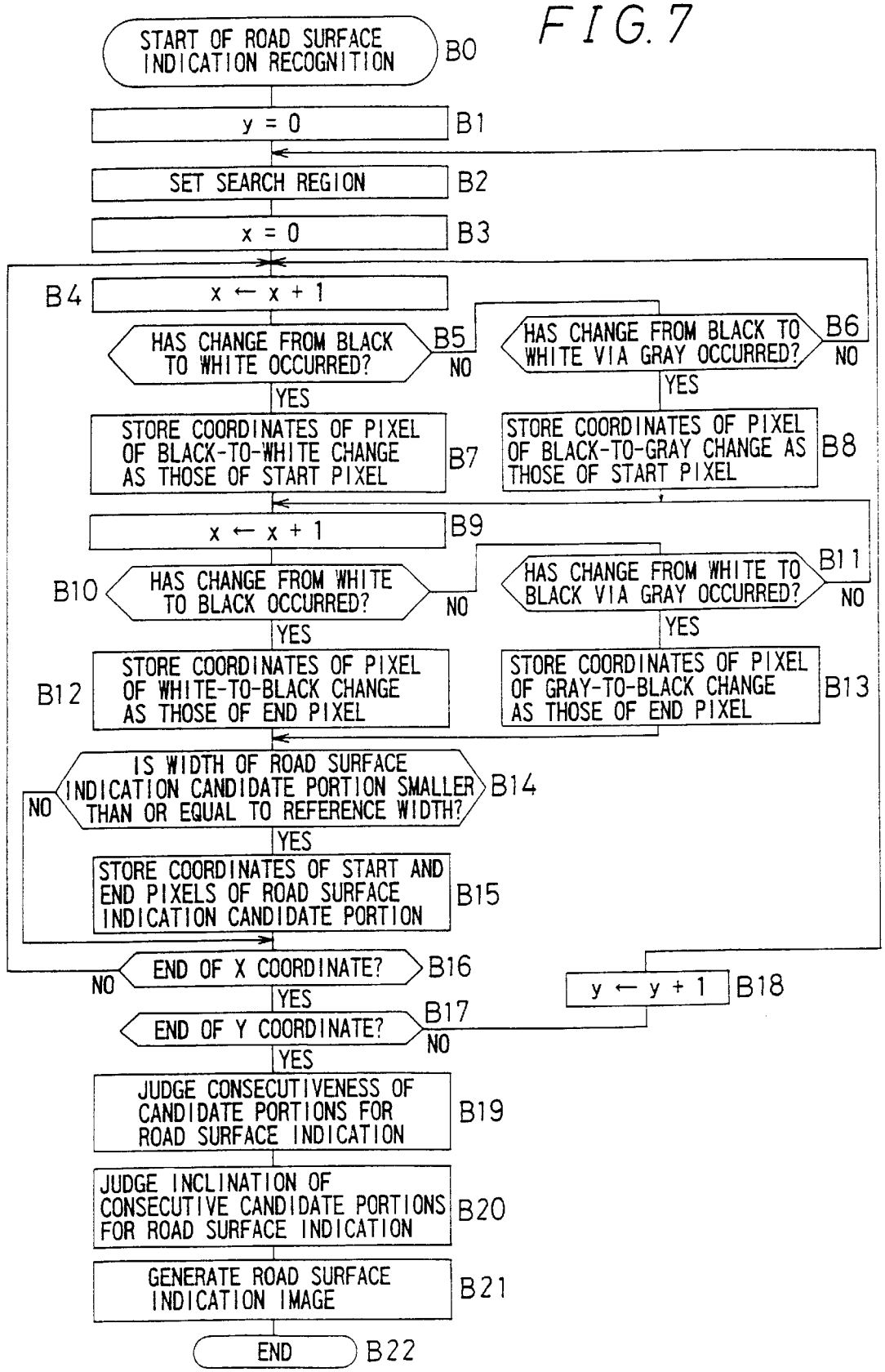
FIG. 7 is a flowchart showing a second recognition process that is executed by the road surface indication recognizing section 13 of the image recognition apparatus of FIG. 1 to recognize road surface indications.

FIG. 7 is a flowchart showing a process for recognizing road surface indications in a left input image IIL in a case where all the combination patterns of FIGS. 4A–4D are used.

After the road surface indication recognition process is started at step B0, the process goes to step B1. Steps B1–B5 are the same as the respective steps A1–A5 in the flowchart of FIG. 5. If it is judged that the X-direction density value variation pattern in the judgment subject range is different from the first reference increase pattern, the process goes from step B5 to step B6. If it is judged that the X-direction density value variation pattern in the judgment subject range coincides with the first reference increase pattern, the process goes from step B5 to step B7. Step B7 is the same as step A6 in the flowchart of FIG. 5.

At step B6, the road surface indication recognizing section 13 judges whether on the subject row the X-direction density value variation pattern in a judgment subject interval that consists of three or more pixels including a judgment pixel whose x coordinate is equal to the current value of variable x coincides with the second reference increase pattern in which the density value varies from a value corresponding to black to a value corresponding to white via a value corresponding to gray. For example, the judgment subject interval is an interval that consists of the judgment pixel and a predetermined number (three or more) of pixels that are located to the left of and are adjacent to the judgment pixel. If it is judged that the X-direction density value variation pattern in the judgment subject interval is different from the second reference increase pattern, the process returns from step B6 to step B4. Steps B4–B6 are repeatedly executed while the judgment pixel is shifted in the X direction by one pixel each time until the X-direction density value variation pattern in the judgment subject range coincides with the first reference increase pattern or the X-direction density value variation pattern in the judgment subject interval coincides with the second reference increase pattern. If it is judged that the X-direction density value variation pattern in the judgment subject interval coincides with the second reference increase pattern, the process goes from step B6 to step B8.

At step B8, the road surface indication recognizing section 13 stores the X and Y coordinates of a pixel on the subject row where the density value varies from a value corresponding to black to a value corresponding to gray in the work memory of the road surface indication recognizing section 13 as the X and Y coordinates of the start pixel of a new candidate portion $AQ_y$ for a road surface indication (temporary storage). If the coordinates of the start pixel of a new candidate portion $AQ_y$ has been acquired at step B7 or B8, the process goes to step B9. Steps B9 and B10 are the same as the respective steps A7 and A8 in the flowchart of FIG. 5. If it is judged at step B10 that the X-direction density value variation pattern in the judgment subject range is different from the first reference decrease pattern, the process goes from step B10 to step B11. If it is judged at step B10 that the X-direction density value variation pattern in the judgment subject range coincides with the first reference decrease pattern, the process goes from step B10 to step B12. Step B12 is the same as step A9 in the flowchart of FIG. 5.

At step B11, the road surface indication recognizing section 13 judges whether on the subject row the X-direction density value variation pattern in a judgment subject interval that consists of three or more pixels including a judgment pixel whose X coordinate is equal to the current value of variable x coincides with the second reference decrease pattern in which the density value varies from a value corresponding to white to a value corresponding to black via a value corresponding to gray. If it is judged that the X-direction density value variation pattern in the judgment subject interval is different from the second reference decrease pattern, the process returns from step B11 to step B9. Steps B9–B11 are repeatedly executed while the judgment pixel is shifted in the X direction by one pixel each time until the X-direction density value variation pattern in the judgment subject range coincides with the first reference decrease pattern or the X-direction density value variation pattern in the judgment subject interval coincides with the second reference decrease pattern. If it is judged that the X-direction density value variation pattern in the judgment subject interval coincides with the second reference decrease pattern, the process goes from step B11 to step B13.

At step B13, the road surface indication recognizing section 13 stores the X and Y coordinates of a pixel on the subject row where the density value varies from a value corresponding to gray to a value corresponding to black in the work memory of the road surface indication recognizing section 13 as the X and Y coordinates of the end pixel of a new candidate portion $AQ_y$ (temporary storage). If the coordinates of the end pixel of a new candidate portion $AQ_y$ has been acquired at step B12 or B13, the process goes to step B14. Steps B14–B21 are the same as the respective steps A10 and A17 in the flowchart of FIG. 5. The execution of the process shown by the flowchart of FIG. 7 is finished at step B22.

As described above, in the process of FIG. 5 (steps A2–A14) for searching for candidate portions for road surface indications, in each row of a left input image IIL, portions where the density value varied according to the pattern of FIG. 4A are obtained as candidate portions and among the candidate portions thus obtained only ones whose width in the X direction is smaller than or equal to the reference width WAQ are selected. In the candidate portion search process of FIG. 7 (steps B2–B18), in each row of a left input image IIL, portions where the density value varied according to any of the patterns of FIGS. 4A–4D are obtained as candidate portions and among the candidate portions thus obtained only ones whose width in the X direction is smaller than or equal to the reference width WAQ are selected. It is highly probable that the thus-selected candidate portions in the left input image IIL correspond to road surface indications. Therefore, by judging that the selected candidate portions in the left input image IIL correspond to road surface indications, the road surface indication recognizing section 13 can easily recognize the road surface indication in the left input image IIL, based on density value variation patterns in the X direction in each row of the left input image IIL.

Where candidate portions whose widths are greater than 0 pixel and smaller than or equal to the reference width WAQ for a candidate portion are selected from all the candidate portions in a left input image IIL, there is a possibility that the selected candidate portions correspond to a very small object on the road rather than a road surface indication. Road surface indications and very small objects on a road become noise components in recognizing objects to be monitored in the visual fields. Selecting candidate portions whose width is greater than 0 pixel and smaller than or equal to the reference width WAQ is preferable because it enables recognition of not only road surface indications but also objects in a left input image IIL that maybe sources of noise components in recognizing objects to be monitored.

At step A15 or B19, the road surface indication recognizing section 13 selects only candidate portions whose width is smaller than or equal to the reference width WAQ and that are arranged consecutively in the Y direction over a reference number or more of rows among all the candidate portions in a left input image IIL. This is for the following reason. If candidate portions in a left input image III were recognized as corresponding to a road surface indication, only based on the criterion that their width is smaller than or equal to the reference width WAQ, a white object to be monitored in the left input image IIL could be recognized erroneously as a road surface indication. In many cases, in a left input image IIL, road surface indications extend over greater lengths than white objects to be monitored. Recognizing, as corresponding to a road surface indication, candidate portions whose width in the X direction is smaller than or equal to the reference width WAQ and that are arranged consecutively in the Y direction over a reference number or more of rows further increases the accuracy of the recognition of road surface indications.

The road surface indication recognizing section 13 according to the embodiment selects candidate portions that should be recognized as corresponding to road surface indications among all the candidate portions in a left input image IIL, based on not only their width in the X direction and the number of rows over which they are arranged consecutively in the Y direction but also the inclination of an approximately band-like region consisting of candidate portions whose width is smaller than or equal to the reference width WAQ and that are arranged consecutively in the Y direction over a reference number or more of rows. This is for the following reason. Since in a left input image IIL and a right input image IIR road surface indications extend in the direction corresponding to the depth direction in the visual fields, they are not perpendicular to the X direction and have inclinations. Therefore, recognizing that all the candidate portions constituting an approximately band-like region correspond to a road surface indication only when its inclination is a standard one for road surface indications in a displayed image of a road surface further increases the accuracy of the recognition of road surface indications in a left input image IIL.

Where each of the left camera 7 and the right camera 8 uses a wide-angle lens, in a left input image IIL and a right input image IIR the inclination of a road surface indication increases as the position moves from the camera side to the deep side in the spaces of the fields of vision. Therefore, it is even preferable to recognize that all the candidate portions constituting an approximately band-like region correspond to a road surface indication only when the inclination of the approximately band-like region falls within a predetermined allowable range including the standard inclination of road surface indications in a displayed image of a road surface. With this measure, even where each of the left camera 7 and the right camera 8 uses a wide-angle lens, in the road surface indication recognizing section 13 the accuracy of the recognition of road surface indications in an input image can further be increased.

The road surface indication recognizing section 13 may detect candidate portions from either the entire area of a left input image IIL or only its prediction region that is expected to contain road surface indications. Where the entire area of a left input image IIL is employed as a road surface indication search region, the road surface indication recognizing section 13 can recognize road surface indications in the left input image reliably, that is, without failing to recognize part of those. Where only a prediction region of a left input image IIL is employed as a road surface indication search region, the processing load of the road surface indication recognizing section 13 can be reduced and the time necessary for the road surface indication recognition can be shortened.

An edge detection process that is executed by the edge detecting section 15 will be hereinafter described.

Generally, the edge detecting section 15 performs filtering for edge detection on a left input image IIL while referring to a road surface indication image IN and stores a processing result in the edge image memory 16. The filtering for edge detection is realized by what is called a Sobel filter. In this embodiment, the edge detecting section 15 uses a filter coefficient matrix for extracting edges that extend in the Y direction in a left input image IIL. Formula (15) is an example of filter coefficients for edge detection.

$$\begin{bmatrix} 3 & 0 & -3 \\ 3 & 0 & -3 \\ 3 & 0 & -3 \end{bmatrix} \quad (15)$$

In the edge image memory 16, data of an edge detection result of a left input image IIL is in the form of data of an edge image IE that is a monochromatic binary image. The pixel arrangement of the edge image IE of the left input image IIL is the same as that of the left input image IIL. If a pixel of a left input image IIL that corresponds to an arbitrary pixel of an edge image IE belongs to one of remaining edges other than the edges of road surface indications in the left input image IIL or is located in the vicinity of one of the remaining edges, the pixel value of the pixel of the edge image IE is one of "0" and "1." If a pixel of a left input image IIL that corresponds to an arbitrary pixel of an edge image IE neither belongs to any of remaining edges other than the edges of road surface indications in the left input image IIL nor is located in the vicinity of any of the remaining edges, the pixel value of the pixel of the edge image IE is the other of "0" and "1." In the embodiment, the pixel value of a pixel of an edge image IE that corresponds to a pixel belonging to or located in the vicinity of an edge in a left input image IIL is set at "1."

When filtering for edge detection using the filter coefficient matrix of Formula (15) is performed on an left input image IIL shown in FIG. 8A, an edge image shown in FIG. 8B is obtained. As shown in FIG. 8D, an edge image IE that is produced by the edge detecting section 15 according to the embodiment is an image obtained by superimposing a road surface indication image IN of FIG. 8C on the conventional edge image of FIG. 8B. As a result, the edge image IE of FIG. 8D according to the embodiment is an image obtained by removing the edges of the road surface indications from the conventional edge image of FIG. 8B. Since the edge detection process according to the embodiment detects only the edges extending in the Y direction in a left input image IIL, vertical lines corresponding to the side surfaces of objects to be monitored that are contained in a left input image IIL, such as lines corresponding to vertical portions of the circumferential portions of tires, are obtained as edges.

Figure 9:
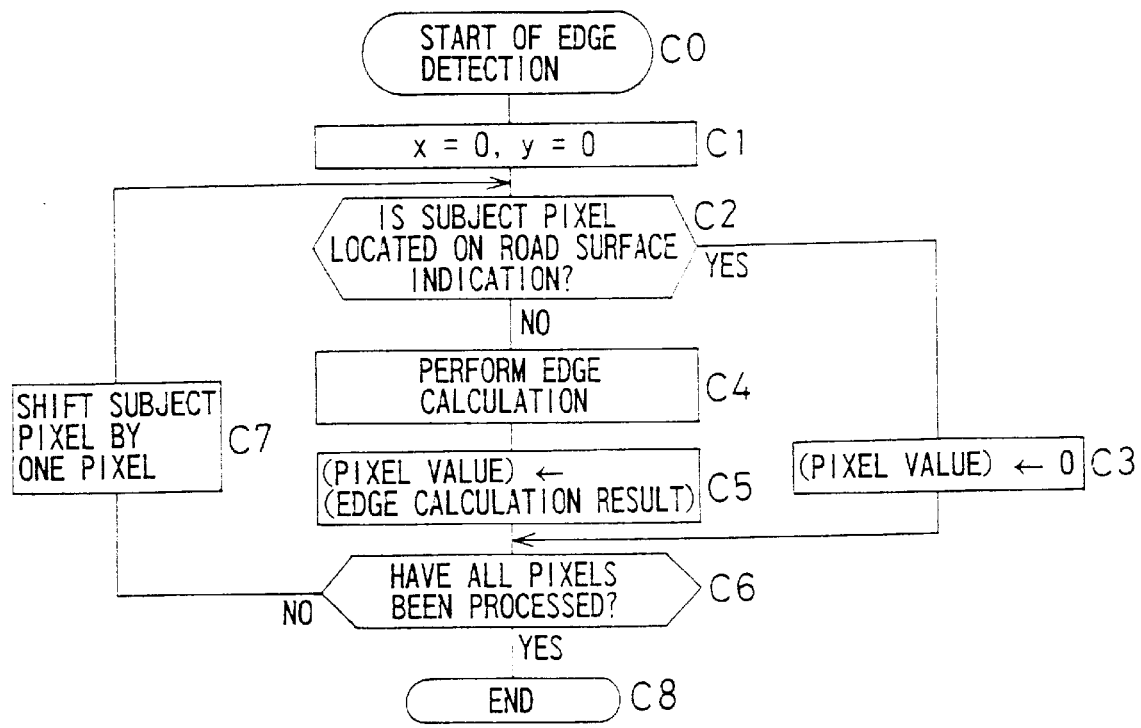
FIG. 9 is a flowchart showing the edge detection process that is executed by the edge detecting section 15 of the image recognition apparatus of FIG. 1.

FIG. 9 is a flowchart showing the edge detection process that is executed by the edge detecting section 15. After the edge detection process is started at step C0, the process goes to step C1. At step C1, the edge detecting section 15 substitutes initial values "0" into variables x and y, respectively, that represent the X coordinate and the Y coordinate of a subject pixel for edge detection. At step C2, first the edge detecting section 15 selects, as a subject pixel, a pixel in a left input image IIL whose X and Y coordinates are equal to the current values of variables x and y. Then, the edge detecting section 15 judges whether the subject pixel of the left input image belongs to a road surface indication portion in the left input image IIL. To this end, the edge detecting section 15 judges whether the pixel value of the pixel of a road surface indication image IN that corresponds to the subject pixel of the left input image IIL is equal to "0" indicating that the subject pixel of the left input image IIL belongs to a road surface indication. If the pixel value of the corresponding pixel of the road surface indication image IN is equal to the road surface indication correspondence value (i.e., "0"), the subject pixel of the left input image IIL should belong to a road surface indication. Therefore, the process goes from step C2 to step C3.

At step C3, the edge detecting section 15 sets the pixel value of the pixel of an edge image IE that corresponds to the subject pixel of the left input image IIL at a value "0" indicating that the pixel a remaining portion other than edges, and stores the thus-set pixel value in the edge image memory 16. With this measure, the pixel value of a pixel of the edge image IE that corresponds to a pixel of the left input image IIL that belongs to a road surface indication is given the remaining portion correspondence value (i.e., "0") irrespective of whether the pixel belonging to the road surface indication is located on or in the vicinity of an edge.

If the pixel value of the pixel of the road surface indication image IN that corresponds to the subject pixel of the left input image IIL is different from the road surface indication correspondence value, the subject pixel of the left input image IIL should be out of a road surface indication. Therefore, the process goes from step C2 to step C4. At step C4, the edge detecting section 15 extracts a predetermined region centered by the subject pixel from the left input image IIL and performed filtering for edge extraction using a matrix having as elements the density values of the pixels in the extracted region and the filter coefficient matrix of Formula (15). For example, the pixel arrangement of the extracted region is the same as the element arrangement of the filter coefficient matrix and the product of a matrix having as elements the density values of the pixels in the extracted region and the filter coefficient matrix is calculated as a filter calculation result. The filter calculation result is binarized by using a predetermined threshold value. The filter calculation result is binarized to "1" if it is greater than or equal to the threshold value, and to "0" if it is smaller than the threshold value. At step C5, the edge detecting section 15 substitutes the binarized filter calculation result into the pixel value of the pixel of the edge image IE that corresponds to the subject pixel of the left input image IIL and stores the thus-set pixel value in the edge image memory 16. Where the left input image IIL is of 256 gradations and the filter coefficient matrix of Formula (15) is used, the threshold value to be used for binarizing a filter calculation result is set at 120.

At step C6, the edge detecting section 15 judges whether all the pixels of the left input image IIL have been subjected to the edge detection process of steps C2–C5. If there remains a pixel(s) that has not been subjected to steps C2–C5 yet, the process goes from step C6 to step C7. At step C7, the edge detecting section 15 updates variables x and y to coordinates of a pixel that has not been subjected to steps C2–C5 yet. After the updating, the process returns from step C7 to step C2. Steps C2–C7 are repeatedly executed while the subject pixel is shifted until all the pixels of the left input image IIL are subjected to the edge detection process. If it is judged that all the pixels of the left input image IIL are subjected to the edge detection process, the process goes from step C6 to step C8, where the execution of the process shown by the flowchart of FIG. 9 is finished.

By executing the above process, the edge detecting section 15 can detect Y direction edges in the left input image IIL and remove the edges of road surface indications in the left input image IIL from the edge image IN at the same time. The calculation for edge detection for one pixel takes longer time than other kinds of calculation because it is a matrix calculation. The edge detecting section 15 performs the calculation for edge detection on only the pixels outside road surface indications among all the pixels of the left input image IIL and performs a process of substituting the fixed value "0" into the pixel values of the pixels within the road surface indications in the left input image IIL. This makes the number of times the matrix calculation for edge detection according to the embodiment is performed smaller than the number of times the matrix calculation is performed by the edge detecting section in the conventional image recognition apparatus. Therefore, the time necessary for the edge detection process according to the embodiment can be made shorter than the time necessary for the conventional edge detection process. As a result, the processing load of the edge detecting section 15 of the image recognition apparatus 1 according to the embodiment is made lighter than that of the edge detecting section of the conventional image recognition apparatus.

In the embodiment, edges in the Y direction in a left input image IIL are detected. In a portion in an edge image IE that corresponds to an arbitrary Y-direction edge in the left input image IIL, pixels having a pixel value "1" (hereinafter referred to as "edge pixels") indicating that the corresponding pixels of the left input image IIL belong to an edge are arranged consecutively in the Y direction. An arbitrary edge in a left input image IIL is more intense when the length in the Y direction of the edge in the left input image IIL is greater, that is, when the number of edge pixels that are arranged consecutively in the Y direction in a portion in an edge image IE that corresponds to the edge in the left input image IIL is larger.

Figure 10:
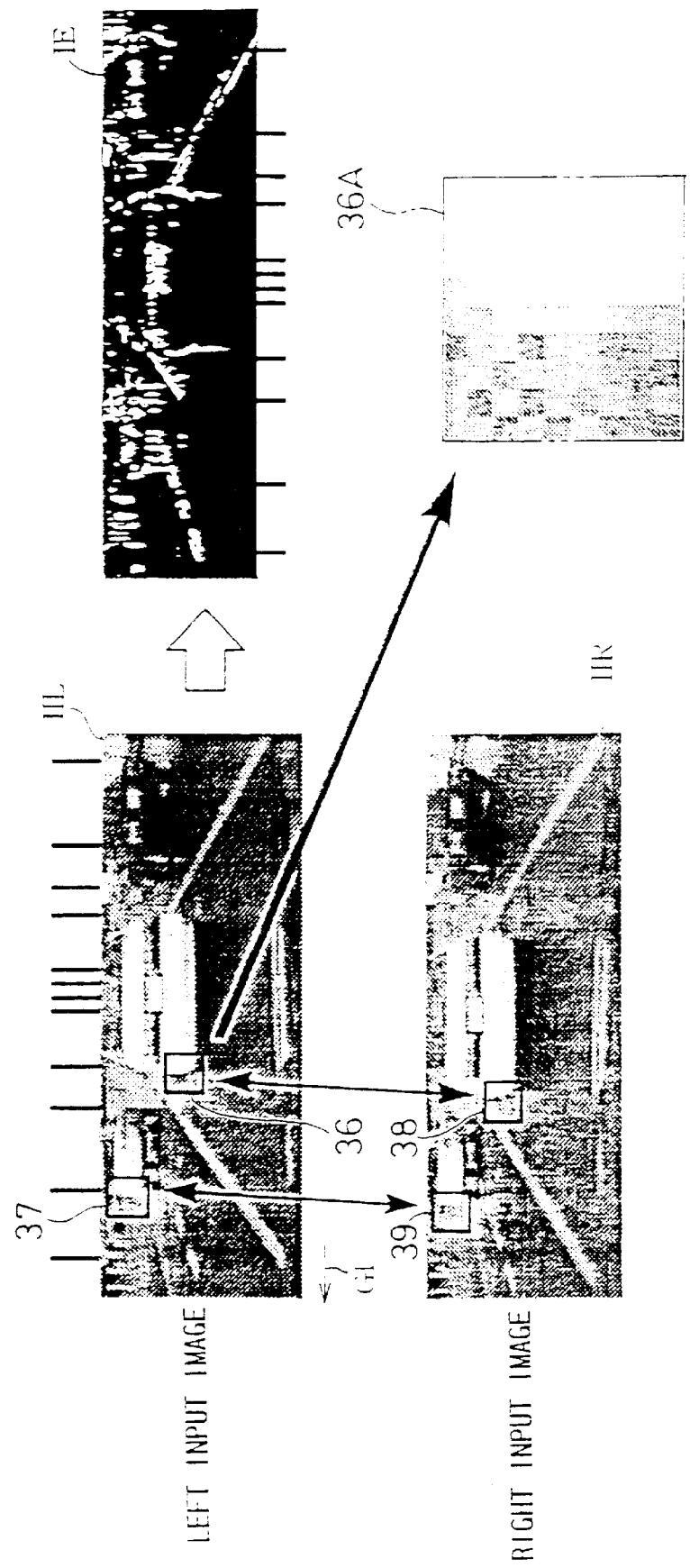
FIG. 10 illustrates a matching process that is executed by a matching section 17 of the image recognition apparatus of FIG. 1.

A matching process that is executed by the matching section 17 will be described below. Generally, first, the matching section 17 selects a predetermined number of edges, in order from the one having the highest edge intensity, from all the remaining edges in a left input image IIL excluding the edges of road surface indications, based on an edge image IE as shown in FIG. 10 of the left input image IIL. Portions of the left input image IIL each of which includes at least part of each of the selected edges are extracted as reference patterns. A reference pattern 36A shown in FIG. 10 is an enlarged version of a reference pattern 36 in the left input image IIL shown in FIG. 10. Then, the matching section 17 conducts matching between the reference pattern and a right input image IIR using a pattern matching method. In the example left input image IIL and right input image IIR shown in FIG. 10, the density distributions of two reference patterns 36 and 37 in the left input image IIL are the same as or very close to those of portions 38 and 39 in the right input image IIR that are congruous with the reference patterns 36 and 37, respectively. The positions of the portions 38 and 39 in the right input image IIR whose density distributions are sufficiently close to the density distributions of the respective reference patterns 36 and 37 are obtained as a matching result.

Figure 11:
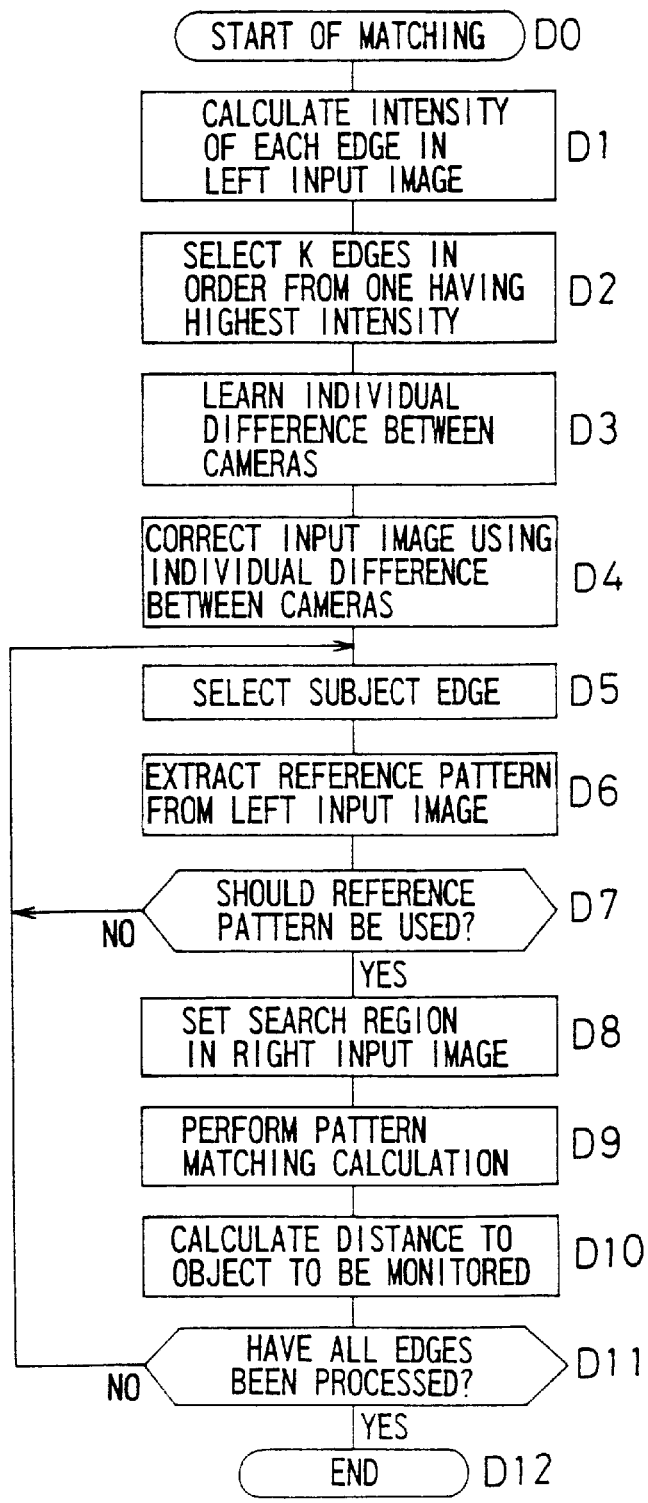
FIG. 11 is a flowchart showing the matching process that is executed by a matching section 17 of the image recognition apparatus of FIG. 1.
Figures 12A, 12B:
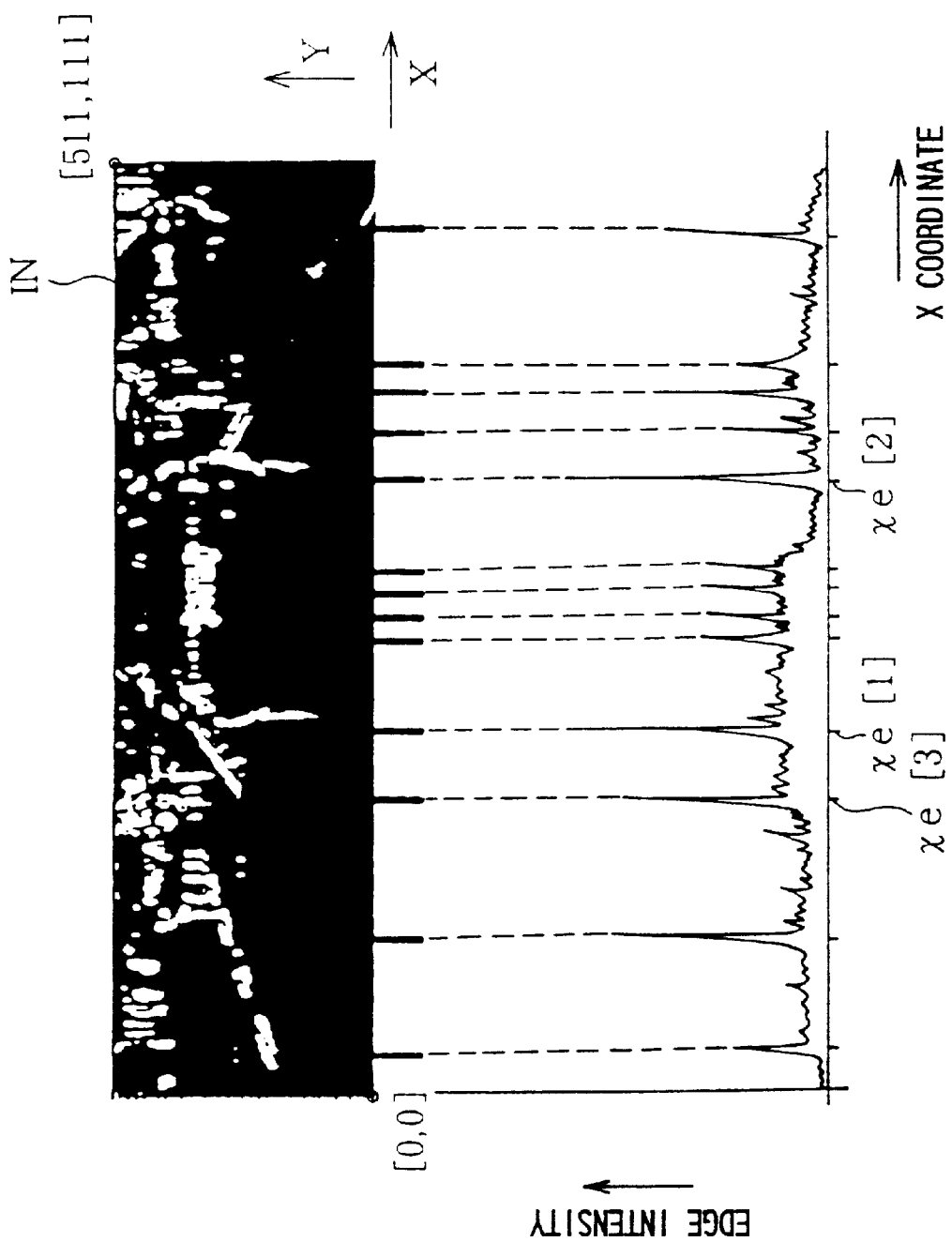
FIG. 12A shows an edge image PE of a left input image IIL.
FIG. 12B is a graph showing an edge intensity profile with respect to the X coordinate of the left input image IIL.

FIG. 11 is a flowchart showing the matching process that is executed by the matching section 17. After generation of an edge image IE of a left input image IIL, the matching process is started at step D0, whereupon the process goes to step D1. At step D1, the matching section 17 determines the intensity of each of remaining Y-direction edges in the left input image IIL other than the edges of road surface indications, based on the edge image IE of the left input image IIL. To this end, first, the sum of the pixel values of all the pixels on each column of the edge image IE that is parallel with the Y direction. When the sum of the pixel values of all the pixels on a column of the edge image IE is larger, the edge on the column of the left input image IIL that corresponds to the column of the edge image IE is more intense. As a result, based on the edge image IE, a graph showing an edge intensity profile with respect to the X coordinate of the left input image IIL is obtained. For example, for an edge image IE shown in FIG. 12A, a graph showing an edge intensity profile shown in FIG. 12B is obtained.

Returning to FIG. 11, at step D2, the matching section 17 selects a predetermined number K of edges, in order from the one having the highest edge intensity, from all the Y-direction edges of the left input image IIL other than the edges of road surface indications, based on the edge intensity values that were determined at step D1. The X coordinates of the columns on which the selected edges exist are stored, in descending order of edge intensity, in a storage section for peak edge storage that is provided in the matching section 17. To this end, the predetermined number K of maximal edge intensity positions of the curve representing the edge intensity profile with respect to the X coordinate of the left input image IIL are searched for in order from the one having the highest edge intensity and X coordinates $xe[0]$ to $xe[K-1]$ of the thus-found maximal positions in the graph are acquired.

At step D3, the matching section 17 learns an individual, color-related difference between the left camera 7 and the right camera 8, based on the left input image IIL and the right input image IIR. At step D4, the matching section 17 corrects the density values of the pixels of at least one of the left input image IIL and the right input image IIR using an offset value commensurate with the learned individual difference.

Steps D5–D11 relate to one subject edge in the left input image IIL. At steps D5–D11, a reference pattern $AR[k]$ including part of a subject edge is matched with the right input image IIR by using a pattern matching method and the distance to an object to be monitored that exists in the reference pattern $AR[k]$ is determined based on a matching result. Suffix k is an integer that is greater than or equal to 0 and smaller than the number K of edges that were selected at step D2. All the Y-direction edges in the left input image IIL that were selected at step D2 are processed in order from the one having the highest edge intensity. To this end, first, at step D5, the matching section 17 selects, as the X coordinate of a subject edge, the X coordinate $xe[k]$ of an edge having the highest edge intensity among the edges that are part of all the Y-direction edges in the left input image IIL selected at step D2 and that have not been processed yet at step D5–D11.

At step D6, the matching section 17 extracts, from the left input image IIL, as a reference pattern $AR[k]$, a portion including part of the subject edge $AE[k]$ on the column that consists of the pixels having the selected X coordinate $xe[k]$. At step D7, the matching section 17 judges whether an effective matching result can be obtained by using the extracted, latest reference pattern $AR[k]$. If it is judged that an effective matching result cannot be obtained, the process returns from step D7 to step D5. The process goes from step D7 to D8 and the latest reference pattern $AR[k]$ is used for pattern matching calculation only when it is judged that an effective matching result can be obtained.

At step D8, the matching section 17 sets, in the right input image IIR, a search region $AU[k]$ corresponding to the latest reference pattern $AR[k]$. At step D9, the matching section 17 conducts matching between the latest reference pattern AR[k] and the right input image by a pattern matching method using the search region AU[k] corresponding to the latest reference pattern AR[k]. A matching result for the latest reference pattern AR[k] is supplied to the object recognizing section 18.

At step D10, if supplied with an effective matching result for the latest reference pattern AR[k], the object recognizing section 18 recognizes that the object existing in the latest reference pattern AR[k] in the left input image IIL is located in the visual fields of the left camera 7 and the right camera 8. Further, the object recognizing section 18 calculates a distance $W_{OB[k]}$ from the recognized object to the image recognition apparatus 1, based on the matching result for the latest reference pattern AR[k]. The calculated distance $W_{OB}$ [k] to the object is supplied to the vehicle control apparatus 5 and the alarming apparatus 6.

At step D11, the matching section 17 judges whether all the edges selected at step D2 have been subjected to steps D5–D10. If there remains a selected edge(s) that has not been processed yet, the process returns from step D11 to step D5. Steps D5–D11 are repeatedly executed while a new edge is selected in descending order of edge intensity at step D5 until all the edges selected at step D2 are processed. If all the selected edges have been subjected to steps D5–D10, the process goes from step D11 to step D12, where the execution of the process shown by the flowchart of FIG. 11 is finished.

For example, the pattern matching between the reference pattern AR[k] and the right input image IIR that is performed at step D9 is performed according to the following procedure. First, a portion in the right input image IIR is extracted as a calculation subject portion. The calculation subject portion includes at least one pixel in the search region AU[k] and has a shape that is congruous with the reference pattern AR[k]. To compare the density value distribution of the calculation subject portion with that of the reference pattern AR[k], correlation between the calculation subject portion and the reference pattern AR[k] is determined. The correlation calculation is repeated while the position of the calculation subject portion in the right input image IIR is changed until every pixel of the search region AU[k] is used at least once in the correlation calculation. The degree of correlation between the calculation subject portion and the reference pattern AR[k] is lower when the density value distribution of the calculation subject portion in the right input image IIR is more similar to that of the reference pattern AR[k]. The degree of correlation is lowest when the object existing in the calculation subject portion in the right input image IIR is the same as the object existing in the reference pattern AR[k] in the left input image ILL. After completion of the all correlation calculation, the position of a calculation subject portion in the right input image IIR that has the lowest correlation is output as a matching result.

In the pattern matching calculation, the matching section 17 uses the color density values of pixels as indices. Where the color density values of pixels are used as indices, correlation between a reference pattern AR[k] and a calculation subject portion in a right input image IIR is determined according to Equation (16) in the following manner. First, the difference between a density value $DL_{i,j}$ of each pixel in the reference pattern AR[k] and a density value $DR_{i,j}$ of the corresponding pixel in the calculation subject portion is calculated. Then, the sum of density value differences $DL_{i,j} - DR_{i,j}$ for all the pixels in the reference pattern AR[k] is calculated. The calculated sum is used as a value representing correlation between the reference pattern AR[k] and the calculation subject portion in the right input image IIR. In Equation (16), it is assumed that the pixel arrangement of the reference pattern AR[k] is J rows and I columns. The position of an arbitrary pixel relative to the reference pattern AR[k] is the same as the position, relative to the calculation subject portion, of the pixel in the calculation subject portion that corresponds to the above arbitrary pixel. When the reference pattern AR[k] is superimposed on the calculation subject portion in the right input image IIR in such a manner that the X and Y axes of the former coincide with those of the latter, an arbitrary pixel in the reference pattern AR[k] is superimposed on the corresponding pixel in the calculation subject portion. Where a reference pattern AR[k] is matched with a right input image IIR by the above pattern matching method using the color density values of the pixels as indices, the matching section 17 can easily conduct matching between the reference pattern AR[k] and the right input image IIR by simplest calculation.

$$\text{Correlation} = \sum_{i=0}^{I-1} \sum_{j=0}^{J-1} [DL_{i,j} - DR_{i,j}] \quad (16)$$

Where the color density values themselves of pixels are used as indices of matching, it is preferable that the matching section 17 correct, prior to setting of a reference pattern, the density values of the respective pixels of at least one of a left input image IIL and a right input image IIR using an offset amount commensurate with an individual, color-related difference between the cameras. The setting of a reference pattern AR[k] and the calculation for matching between the reference pattern AR[k] and the right input image IIR are performed by using corrected input image(s). This prevents a correlation value from being affected by an individual difference, if any, between the left camera 7 and the right camera 8. Therefore, the matching accuracy of the matching section 17 can be increased.

It is even preferable that the matching section 17 learn an individual, color-related difference between the cameras and use the learned difference for correcting an image. This enables the matching section 17 to correct an input image in consideration of a variation in manufacture of an individual difference in a color-related characteristic between the left camera 7 and the right camera 8 and its variation with age. Therefore, when there is an individual difference between the left camera 7 and the right camera 8, the matching accuracy of the matching section 17 can further be increased.

An individual, color-related difference between the left camera 7 and the right camera 8 is caused in the following manner. For example, disposed at different positions, the left camera 7 and the right camera 8 receive light in a somewhat different manner. Even if the left camera 7 and the right camera 8 have the same configuration, because of variations in manufacture, they are not always the same in color-related characteristics such as the sensitivity to light. Where the left camera 7 and the right camera 8 have an individual difference in a color-related characteristic, when they shoot a single object, the absolute values of the density values of the pixels constituting the object in a left input image IIL are different from those of the pixels constituting the object in a right input image IIR.

In the correction of an input image at steps D3 and D4 according to the embodiment, a difference ΔDA is used as an individual, color-related difference between the left camera 7 and the right camera 8. As expressed by Equation (17), the difference ΔDA is obtained by subtracting an average DAR of the density values of all the pixels of the right input image IIR from an average DAL of the density values of all the pixels of the left input image IIL. In the embodiment, the calculated individual difference ΔDA itself is used as an offset value; as expressed by Equation (18), the density value $DR_{x,y}$ of each pixel of the right input image IIR is updated by adding the offset value ΔDA to it.

$$\Delta DA = DAL - DAR \quad (17)$$

$$DR_{x,y} \leftarrow DR_{x,y} + \Delta DA \quad (18)$$

Figure 13A:
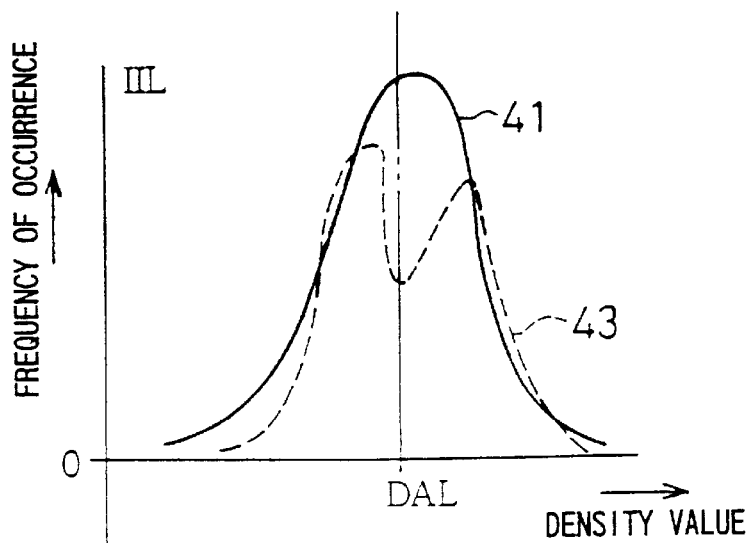
FIGS. 13A and 13B are histograms of the frequency of pixel occurrence with respect to the density value for a left input image IIL and a right input image IIR, respectively, and are used for explaining correction of a left input image IIL and a right input image IIR.
Figure 13B:
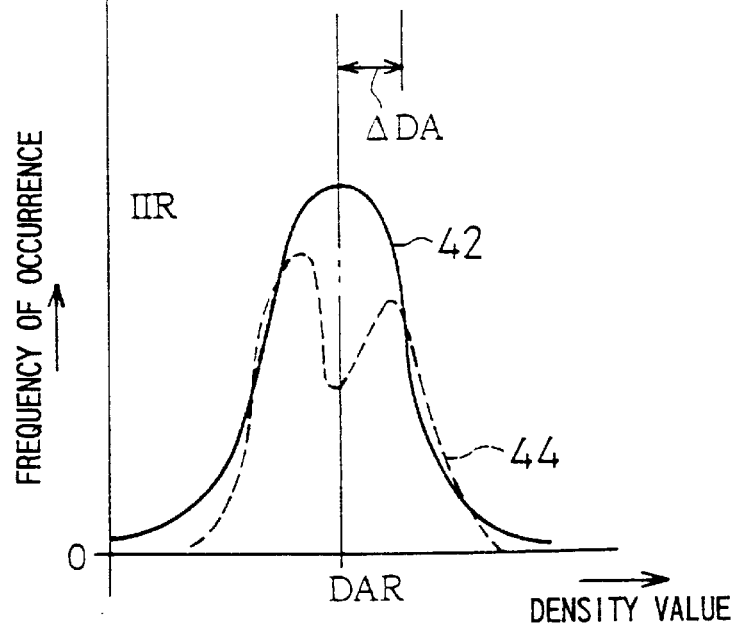

FIG. 13A is a histogram showing the frequency of pixel occurrence with respect to the density value for a left input image IIL. FIG. 13B is a histogram of the frequency of pixel occurrence with respect to the density value for a right input image IIR. In the image recognition apparatus 1 that is provided in the drive assisting apparatus 2 for the vehicle, a left input image IIL and a right input image IIR contain approximately the same road surfaces and objects. As indicated by solid lines 41 and 42, histograms of the frequency of occurrence with respect to the density value for such a left input image IIL and right input image IIR have a single maximum value and are similar in shape. Therefore, the difference ΔDA between averages of the density values of the left input image ILL and the right input image IIR varies depending on only the individual, color-related difference between the left camera 7 and the right camera 8. Since averages of the density values of a left input image IIL and a right input image IIR are used for calculating an individual difference, there is no problem even if the left input image IIL and the right input image IIR have histograms of the frequency of pixel occurrence with respect to the density value that have two or more maximum values as indicated by broken lines 43 and 44. Where the difference ΔDA between averages of the density values of a left input image IIL and a right input image IIR is used as an individual difference in correcting the left input image IIL and the right input image IIR at steps D3 and D4, no part for individual difference measurement is necessary and hence increase in the number of parts can be prevented.

In the embodiment, the matching section 17 learns an individual difference every time a left input image IIL and a right input image IIR are taken. However, the invention is not limited to such a case; an individual difference may be learned regularly or irregularly or may not be learned at all. Where an individual difference is not learned, an input image(s) may be corrected by using a value that was set when the image recognition apparatus 1 was shipped from a factory. The correction of an input image(s) maybe omitted if the left camera 7 and the right camera 8 have almost no individual, color-related difference.

In performing the pattern matching calculation, the matching section 17 may use, as indices, variation amounts of the color density values of pixels instead of the color density values of the pixels. For example, a variation amount of the color density value of a pixel is a difference between the density values of two pixels that are adjacent to each other. Where variation amounts of the color density values of pixels are employed as indices, the correlation between a reference pattern AR[k] and a calculation subject portion in a right input image IIR is determined according to Equation (19). First, in a left input image IIL, a difference $DL_{i,j} - DL_{i+1,j}$ between the density values of two adjacent pixels is calculated for each pixel in the reference pattern AR[k]. Similarly, in the right input image IIR, a difference $DR_{i,j} - DR_{i+1,j}$ between the density values of two adjacent pixels is calculated for each pixel in the calculation subject portion. Then, the difference between a density value difference $DL_{i,j} - DL_{i+1,j}$ between each pixel in the reference pattern AR[k] and the pixel adjacent to it and a density value difference $DR_{i,j} - DR_{i+1,j}$ between the pixel in the calculation subject portion that corresponds to the pixel in the reference pattern AR[k] and the pixel adjacent to it is calculated. Finally, the sum of the differences between the density value differences for all the pixels of the reference pattern AR[k] is calculated. The calculated sum is used as a a value representing the correlation between the reference pattern AR[k] and the calculation subject portion in the right input image IIR. Two adjacent pixels to be used for calculating a density value difference are not limited to two pixels that are arranged parallel to the X direction and may be two pixels that are arranged parallel to the Y direction.

$$\text{Correlation} = \sum_{i=0}^{I-1} \sum_{j=0}^{J-1} [(DL_{i,j} - DL_{i+1,j}) - (DR_{i,j} - DR_{i+1,j})] \quad (19)$$

Where variation amounts of the color density values of pixels are used as indices in the correlation calculation, the density distribution of a reference pattern AR[k] in a left input image IIL and that of a right input image IIR are compared with each other in a relative manner. Therefore, even if the left camera 7 and the right camera 8 have an individual difference, the individual difference does not affect a correlation value. As a result, the matching accuracy of the matching section 17 can be increased. Where variation amounts of the color density values of pixels are used as indices, steps D3 and D4 for correcting an input image(s) can be omitted. This simplifies the matching process.

Where the color density values of pixels or their variation amounts are used as indices for pattern matching, it is preferable that the judgment of the effectiveness of a reference pattern AR[k] at step D7 be performed in the following manner. The matching section 17 calculates a density value difference $\Delta D_{AR[k]}$ between a maximum density value and a minimum density value of the pixels in the latest reference pattern AR[k] that was extracted at step D6 and compared the calculated density value difference $\Delta D_{AR[k]}$ with a predetermined reference density value difference ΔDCe. The reference density value difference ΔDCe is determined in advance based on the minimum difference between maximum density values and minimum density values of reference patterns that enable effective matching. Where a left input image IIL and a right input image IIR are of 256 gradations, the reference density value difference ΔDCe for the reference pattern judgment is of 50 gradations. If the density value difference $\Delta D_{AR[k]}$ of the latest reference pattern AR[k] is greater than the reference density value difference ΔDCe, a judgment is made that an effective matching result cannot be obtained and the process returns from step D7 to step D5. As a result, the latest reference pattern AR[k] is not used for the pattern matching. As expressed by Inequality (20), it is only when the density value difference $\Delta D_{AR[k]}$ of the latest reference pattern AR[k] is smaller than or equal to the reference density value difference ΔDCe that a judgment that an effective matching result can be obtained is made and the process goes from step D7 to step D8.

$$0 \leq \Delta D_{AR[K]} \leq \Delta DCe \quad (20)$$

In the pattern matching method, matching between a reference pattern AR[k] and a right input image IIR cannot be performed properly unless the reference pattern AR[k] has a certain degree of density variation. For this reason, the matching section 17 judges whether effective matching can be performed with each extracted reference pattern AR[k], based on the density value difference $\Delta D_{AR[k]}$ between the maximum density value and the minimum density value of the pixels in the reference pattern AR[k]. As a result, the reference pattern AR[k] that are used at steps D8 and D9 is always such that density value difference $\Delta D_{AR[k]}$ is greater than or equal to the reference density value difference $\Delta DCe$. The result of matching between such a reference pattern AR[k] and a right input image IIR should always be effective. A reference pattern AR[k] whose density value difference $\Delta D_{AR[k]}$ is smaller than the reference density value difference $\Delta DCe$ is not used in at steps D8 and D9. This dispenses with pattern matching calculations that would not produce an effective result and thereby shortens the time required for matching of all the reference patterns.

Figure 14A:
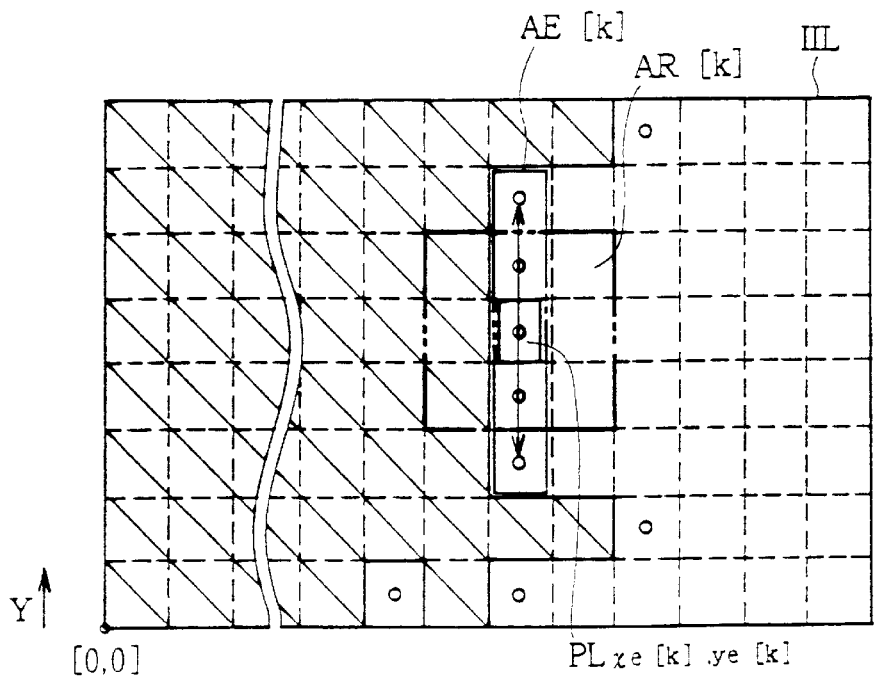
FIGS. 14A and 14B are schematic diagrams showing a left input image IIL and a right input image IIR, respectively, and are used for explaining the structures of a reference pattern and a search region for pattern matching calculation.
Figure 14B:
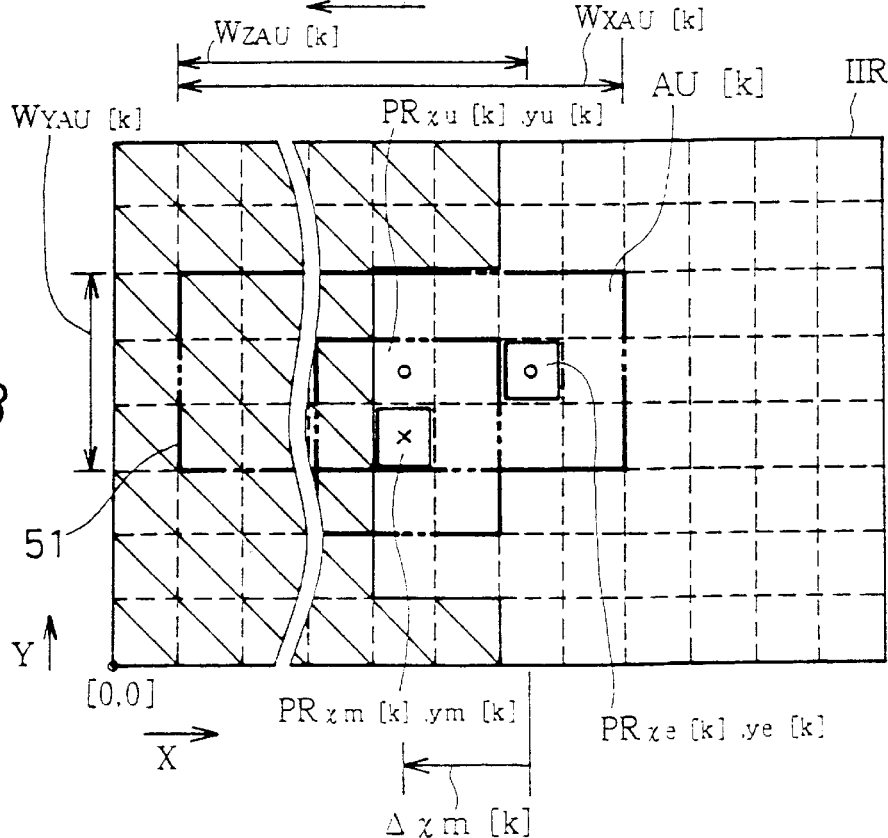

The reference pattern AR[k] and the search region AU[k] that are used in the pattern matching at steps D5–D9 of the matching process of FIG. 11 will be described below in more detail with reference to FIGS. 14A and 14B for an example in which an edge having kth edge intensity is employed as a subject edge. FIGS. 14A and 14B are schematic diagrams showing a left input image IIL and a right input image IIR, respectively. In FIGS. 14A and 14B, each section of the broken-line lattice corresponds to a pixel and pixels with a diagonal line are darker than pixels without a diagonal line. In the left input image IIL of FIG. 14A, pixels corresponding to edge pixels of an edge image IE are given a circle at the center.

It is preferable that a portion in the left input image IIL that is centered by a central pixel $PL_{xe[k], ye[k]}$ of a subject edge AE[k] and that has a predetermined size and shape (see FIG. 14A) be extracted from the left input image IIL as a latest reference pattern AR[k] at step D6. The X coordinates of the pixels of the subject edge AE[k] are the same as the X coordinate xe[k] that was selected at step D5. The Y coordinate ye[k] of the central pixel of the subject edge AE[k] is the Y coordinate of the middle point of the portion where the edge pixels are arranged consecutively on the column that consists of the pixels having the selected X coordinate xe[k] in the edge image IE of the left input image IIL.

In the pattern matching calculation, a search region AU[k] that is narrower than the right input image IIR is set in the right input image IIR for each reference pattern AR[k]. In this case, a calculation subject portion in the right input image IIR that is congruous with the reference pattern AR[k] is set so as to include at least one pixel of the search region AU[k]. Where the search region AU[k] that is narrower than the right input image IIR is set, the processing load of the matching section 17 can be made lighter than in a case where no search region is set and the entire right input image IIR is made a subject of search. It is preferable that the search region AU[k] include a pixel $PR_{xe[k], ye[k]}$ of the right input image IIR that corresponds to the central pixel $PL_{xe[k], ye[k]}$ of the reference pattern AR[k] in the left input image IIL and satisfy one of first conditions and second conditions described below.

The first conditions are as follows. A Y coordinate yu[k] of a central pixel $PR_{xu[k], yu[k]}$ of the search region AU[k] in the right input image IIR should be the same as the Y coordinate ye[k] of the central pixel $PL_{xe[k], ye[k]}$ of the reference pattern AR[k] in the left input image IIL. And a Y-direction width $W_{YAU[k]}$ of the search region AU[k] should be three or more pixels. As a result, in the right input image IIR, the search region AU[k] has a width of one or more pixels in each of the Y+ direction and the Y- direction. Where a search region AU[k] that satisfies the first conditions is set, a result of matching between a reference pattern AR[k] and a right input image IIR can be obtained without causing an error even if the relative positional relationship between the optical axes of the left camera 7 and the right camera 8 is deviated from the design relationship. For example, a deviation in the positional relationship between the optical axes of the left camera 7 and the right camera 8 is caused by distortion of the lens of each camera or insufficient mounting accuracy of each camera.

The second conditions for the search region AU[k] are as follows. The X coordinate xu[k] of the central pixel $PR_{xu[k], yu[k]}$ of the search region AU[k] in the right input image IIR should be deviated in the same direction as a deviation direction GI corresponding to a parallax of the right input image IIR with respect to the left input image IIL from the X coordinate xe[k] of the pixel $PR_{xu[k], yu[k]}$ of the search region AU [k] in the right input image IIR that corresponds to the central pixel $PL_{xe[k], ye[k]}$ of the reference pattern AR[k]. And an X-direction width $W_{XAU[k]}$ of the search region AU[k] should be a width commensurate with an upper limit parallax that is determined based on the arrangement of the left camera 7 and the right camera 8. It is preferable that a distance $W_{ZAU[k]}$ from an end 51 of the search region AU[k] in the deviation direction GI to the pixel $PR_{xe[k], ye[k]}$ of the right input image IIR that corresponds to the central pixel $PL_{xe[k], ye[k]}$ of the reference pattern AR[k] be a distance corresponding to the above upper limit parallax. Where the pixel arrangement of the right input image IIR is 120 rows and 512 columns and the upper limit parallax is greater than or equal to 1.5 m and smaller than or equal to 1.6 m, it is preferable that the distance $W_{ZAU[k]}$ be equal to 80 pixels.

The reason why the search region AU[k] should satisfy the second conditions is as follows. When the distance from the middle point of the left camera 7 and the right camera 8 to an object is shorter, the parallax of the object between the left input image IIR and the right input image IIR is larger. The upper limit of the parallax of an object between the left input image IIR and the right input image IIR is determined by the distance $W_{CAMERA}$ between the left camera 7 and the right camera 8. The deviation direction GI corresponding to the parallax of the right input image IIR with respect to the left input image IIL is determined in accordance with the position of the right camera 8 with respect to the left camera 7. Therefore, it is expected that the object that will be contained in a reference pattern AR[k] in the left input image IIL will occupy, in the right input image IIR, only a range obtained by elongating the portion corresponding to the reference pattern AR[k] in the deviation direction GI by a width corresponding to the upper limit parallax. In the right input image IIR, the portion corresponding to the reference pattern AR[k] consists of pixels corresponding to all the pixels of the reference pattern AR[k].

It is highly probable that in the right input image IIR a calculation subject portion having a minimum correlation value will be found only in the range obtained by elongating the portion corresponding to the reference pattern AR[k] in the deviation direction GI by the distance corresponding to the upper limit parallax. Performing pattern matching by setting a calculation subject portion at a position in the right input image IIR that is separated from the portion corresponding to the reference pattern AR[k] in the deviation direction GI by a distance longer than the distance commensurate with the upper limit parallax or by setting a calculation subject portion at a position that is separated from the portion corresponding to the reference pattern AR[k] in the direction opposite to the deviation direction GI is meaningless and possibly causing a matching error. Where the search region AU[k] is set so as to satisfy the second conditions, in the matching section 17 the frequency of occurrence of a matching error can be minimized and the time required for the pattern matching can be shortened.

In the matching process, the matching section 17 selects, one by one, in descending order of edge intensity, a plurality of edges that were selected at step D2 and steps D5–D11 are executed by using each selected subject edge. As a result, pattern matching is performed by using a plurality of reference patterns that were set in a left input image IIL one by one in descending order of the intensity of the edge included in the reference pattern. This is preferable because pattern matching is performed by using reference patterns in descending order of reliability.

Where pattern matching is performed in descending order of edge intensity, it is preferable that a search region AU[k] be set in a right input image IIR, based on not only the position of the latest reference pattern AR[k] in a left input image IIL but also a matching result between a reference pattern already processed and a right input image IIR. For example, first, a search region is set temporarily based on only the position of the latest reference pattern AR[k] in a left input image IIL. It is preferable that the temporary search region include the pixel of a right input image IIR that corresponds to the central pixel of the reference pattern and satisfy at least one of the first conditions and the second conditions that were described above with reference to FIGS. 14A and 14B. If a calculation subject portion corresponding to an existing matching result is included in the temporary search region, a portion of the temporary search region that is located on the side, deviated in the direction from a reference pattern AR[k-γ] that was used in calculating the known matching result to the latest reference pattern AR[k], of the calculation subject portion corresponding to the existing matching result is set as a search region AU[k]. This is because the probability that in the right input image IIR an object existing in the latest pattern AR[k] also exists in a portion that is located on the side, deviated in the direction from the latest reference pattern AR[k] to the already used reference pattern AR[k-γ], of the calculation subject portion corresponding to the existing matching result is low. Where as described above a search region AU[k] be set based on not only the position of the latest reference pattern AR[k] but also an existing matching result, the search region AU[k] can be made smaller than a search region that is set based on only the position of the reference pattern AR[k]. This makes it possible to further shorten the time required for the pattern matching.

In calculating the intensity of each of remaining Y-direction edges in a left input image IIL other than the edges of road surface indications at step D1, it is preferable that the matching section 17 search for, for each column of an edge image IE, a portion on the column where edge pixels are arranged consecutively in the Y direction and calculate the sum of the pixel values of all the pixels in the portion thus found. Even when two or more remaining edges exist on a single column of a left input image IIL, this makes it possible to select an edge having the highest edge intensity and calculate its intensity. Further, in this case, such short edges as will become noise components can be eliminated and hence the accuracy of recognition of objects in the fields of vision of the cameras is increased.

The double-eye ranging process that is executed by the object recognizing section 18 at step D10 will be described below with reference to FIGS. 14A, 14B, and 2. In a right input image IIR, an X-direction deviation width Δxm[k] of a calculation subject portion in the right input image IIR that has a minimum value of correlation with a reference pattern AR[k] corresponds to the magnitude of parallax of an object existing in the reference pattern AR[k] The object recognizing section 18 is supplied with, as a matching result, the position of the central pixel $PL_{xe[k], ye[k]}$ of the reference pattern AR[k] and the position [xm[k], ym[k]] of the central pixel $PR_{xm[k], ym[k]}$ of the calculation subject portion having the minimum correlation value or its X-direction deviation width Δxm[k]. As expressed by Equation (21), the X-direction deviation width Δxm[k] is a distance from the X coordinate xe[k] of the region in the right input image IIR that corresponds to the reference pattern AR[k] to the X coordinate xm[k] of the calculation subject portion having the minimum correlation value.

$$\Delta xm[k]=|xe[k]-xm[k]| \qquad (21)$$

Where the left camera 7 and the right camera 8 are of the same type, the focal length FL of the left camera 7 is equal to the focal length FR of the right camera 8 (FL=FR). A distance $W_{OB[k]}$ from the left camera 7 and the right camera 8 of the image recognition apparatus 1 to an object $OB_k$ that is located in their visual fields and exists in a reference pattern AR[k] is calculated according to Equation (22) that includes the distance $W_{CAMERA}$ between the left camera 7 and the right camera 8, the focal length FL of the left camera 7, the focal length FR of the right camera 8, the X-direction deviation width Δxm[k] (in the number of pixels), and the horizontal resolution F (unit: m/pixel) of the cameras 7 and 8. In Equation (22), the parameters FL, FR, $W_{CAMERA}$, and F other than the X-direction deviation width Δxm[k] are constants that are determined according to the design of the image recognition apparatus 1. Therefore, actually, the distance $W_{OB[k]}$ to the object $OB_k$ can be calculated by merely dividing a constant CC by the X-direction deviation width Δxm[k] as shown on the right side of Equation (22).

$$W_{OB[k]} = \frac{FL \times W_{CAMERA}}{F \times \Delta xm[k]} = \frac{CC}{\Delta xm[k]} \qquad (22)$$

As described above, when the image recognition apparatus 1 recognizes objects to be monitored around the vehicle, since the pattern matching method is used to calculate a parallax of each object, the image recognition apparatus 1 can recognize an object whose edges extend obliquely in a left input image IIL and a right input image IIR. For example, a motorcycle existing near the self vehicle and another vehicle that is cutting in ahead of the self vehicle can be recognized. When the image recognition apparatus 1 further performs double-eye ranging on objects around the vehicle, since the possibility of occurrence of an error in recognizing objects to be monitored is reduced and objects to be monitored can be stably recognized, the possibility of occurrence of an error in measuring the distances to objects to be monitored is reduced and stable ranging is enabled. In this case, if the edges of road surface indications in a left input image IIL are removed from an edge detection result of the left input image IIL, the road surface indications are prevented from being recognized as objects around the vehicle. Where the edges of road surface indications in a left input image IIL are removed from an edge detection result of the left input image IIL, such small objects to be monitored on a road as could not otherwise be distinguished from noise components that are generated in detecting objects due to road surface indications can be recognized.

When the drive assisting apparatus 2 automatically drives the vehicle, the vehicle control apparatus 5 controls the engine 19 and the braking section 20 so that the distance between the image recognition apparatus 1 and an object to be monitored that is recognized by the image recognition apparatus 1 is kept at a predetermined reference distance. For example, the engine 19 and the braking section 20 are controlled so that the vehicle speed is increased if the distance between the image recognition apparatus 1 and the closest object to be monitored ahead of the self vehicle among the recognized objects to be monitored becomes greater than the reference distance and it is decreased if the distance between the image recognition apparatus 1 and the closest object to be monitored becomes smaller than the reference distance. Since the image recognition apparatus 1 recognizes not only the vehicle ahead but also a cutting-in vehicle and a motorcycle, the engine 19 and the braking section 20 are controlled in accordance with the distance from the vehicle ahead to the self vehicle but also the distance from a cutting-in vehicle or a motorcycle to the self vehicle. In this manner, the self vehicle is driven automatically in such a manner that the self vehicle starts or stops when the vehicle ahead starts or stops and the speed of the self vehicle varies in accordance with appearance of a cutting-in vehicle or a motorcycle.

The image recognition apparatus 1 according to the embodiment is an example of the image recognition apparatus according to the invention. The image recognition apparatus according to the invention can be implemented in other various forms as long as the main configuration and operation remain the same. In particular, the detailed configuration and operation of each processing section of the image recognition apparatus are not limited to the above described ones and may be other ones as long as the latter provide the same advantages.

In the image recognition apparatus 1 according to the embodiment, road surface indications in a left input image IIL are recognized and a reference pattern in the left input image IIL is matched with a right input image IIR. In the image recognition apparatus, the roles of the left input image IIL and those of the right input image IIR maybe interchanged. That is, it is possible to recognize road surface indications in a right input image IIR, detect edges in the right input image IIR other than the edges of the road surface indications, extract a reference pattern from the right input image IIR, based on the detected edges, conduct matching between the reference pattern and a left input image IIL, and perform object recognition, based on a matching result. Further, the arrangement of the left camera 7 and the right camera 8 is not limited to the one in which they are disposed on a mounting axial line that is approximately parallel with a road surface and may be other arrangements as long as the left camera 7 and the right camera 8 are arranged so as to produce a parallax between the left input image IIL and the right input image IIR.

It is sufficient for the image recognition apparatus 1 according to the invention to be equipped with at least the left camera 7, the right camera 8, the edge detecting section 15, the matching section 17, and the object recognizing section 18. At least one of the image memories 11, 12, 14 and 16 maybe omitted. The image recognition apparatus 1 may be configured in such a manner that the road surface indication recognizing section 13 and the road surface indication image memory 14 are omitted and the edge detecting section 15 detect all the edges in a left input image IIL. The image recognition apparatus 1 may be incorporated in apparatuses other than the drive assisting apparatus 2 as long as they utilize a recognition result of objects that are shot by cameras. The apparatus incorporating the image recognition apparatus 1 is not limited to vehicular apparatuses. The image recognition apparatus 1 may be used alone.

The combination of the left input image memory 11 and the road surface indication recognizing section 13 may be used alone as an image processing apparatus for recognizing road surface indications in a road surface image. It is sufficient for such an image processing apparatus for road surface indication recognition to be configured so as to be equipped with at least the left input image memory 11 and the road surface indication recognizing section 13. Such an image processing apparatus for road surface indication recognition may be incorporated in an apparatus that utilizes a road surface indication recognition result. For example, where the image recognition apparatus 1 that recognizes objects around the vehicle using the image processing technology incorporates such an image processing apparatus for road surface indication recognition, prior to image processing for object recognition the image recognition apparatus 1 removes road surface indications that will become noise components in the object recognition from a displayed image of a view around the vehicle, based on a road surface indication recognition result. The image processing for recognition of objects around the vehicle may be the one described in the embodiment, processing in which vertical edges in images of a view shot by two cameras that are arranged so as to produce a parallax are matched with each other and objects are recognized based on a matching result, or processing in which objects are recognized based on an image of a view that is shot by a single camera. If road surface indications are removed from an image by using a road surface indication recognition result, such an image recognition apparatus 1 is prevented from erroneously recognizing the road surface indications as objects to be monitored around the vehicle.

Where a vehicle drive assisting apparatus incorporates the above image processing apparatus for road surface indication recognition, a road surface indication recognition result may be used in recognizing the vehicle position based on the road surface indications. In this case, the drive assisting apparatus further includes a control section that is a central processing unit and a notifying section as typified by a buzzer. The control section detects variations in the positions of road surface indications indicating a traffic lane among the road surface indications drawn on the road surface ahead of the self vehicle, based on a road surface indication recognition result of the image processing apparatus. If the positions of the detected road surface indications with respect to the vehicle center line are varying in the right-left direction of the vehicle at a short, predetermined cycle, the control section judges that the driver of the vehicle is dozing and causes the notifying section to generate an alarm sound. This kind of drive assistance prevents the driver from falling asleep at the wheel.

The recognition processing section 9 of the image recognition apparatus 1 may be implemented in such a manner that software for causing a computer to execute the above-described various processes relating to the image recognition is installed in a computer capable of receiving and storing image data and a central processing unit is caused to operate based on the software. The image processing apparatus for road surface indication recognition may be implemented in such a manner that software for causing a computer to execute the above-described processes relating to the recognition of road surface indications is installed in a computer capable of receiving and storing image data and a central processing unit is caused to operate based on the software. Such software may be installed storing the software on a computer-readable storage medium in advance and reading out the software in a state that the storage medium is mounted in a storage medium reading device of the computer. Examples of the above storage medium are optical storage media as typified by the CD-ROM, magnetic storage media as typified by the floppy disk, and magneto-optical storage media as typified by the MO disc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image recognition apparatus comprising:
   a first camera operable to shoot in a first visual field and to provide a first input image;
   a second camera operable to shoot in a second visual field and to provide a second input image;
   an edge detecting section operable to detect edges in the first input image that is supplied from said first camera;
   a matching section operable to extract, as a reference pattern, a portion in the first input image that includes at least part of a detected edge and to conduct matching between the reference pattern and the second input image that is supplied from said second camera using a pattern matching method;
   an object recognizing section operable to recognize an object in the first and second visual fields, based on a matching result; and
   a road surface indication recognizing section operable to recognize road surface indications contained in at least one input image of the first input image and the second input image,
   wherein said first and second cameras are provided so as to produce a parallax; and
   wherein said edge detecting section is further operable to detect remaining edges other than edges of the road surface indications among all the edges in the first input image, from the first input image, based on a road surface indication recognition result.

2. The image recognition apparatus of claim 1 wherein said road surface indication recognizing section is operable to recognize only the road surface indications in the first input image.

3. The image recognition apparatus of claim 1, wherein
   wherein said first camera and said second camera are disposed on a mounting axial line that is parallel with a road surface in the first and second visual fields so as to be separated from each other by a predetermined distance,
   wherein said road surface indication recognizing section is further operable to:
      divide the at least one input image into a plurality of band-like regions extending in a reference direction corresponding to a direction parallel with the mounting axial line in the at least one input image,
      on the band-like region basis, search for a density variation pattern in the reference direction to determine as a candidate portion for a road surface indication, a portion having one end whose density increases according to a predetermined reference increase pattern and another end whose density decreases according to a predetermined reference decrease pattern, and
      compare a width of the candidate portion for a road surface indication with a predetermined reference width, and when the width of the candidate portion for a road surface indication is smaller than or equal to the reference width, recognize that the candidate portion in the at least one input image is part of a road surface indication, and
   wherein the reference width is predetermined based on the width of a road surface indication that is closest to said first camera and said second camera in a displayed image of the road surface.

4. The image recognition apparatus of claim 3,
   wherein the reference increase pattern is a density variation pattern of from a density corresponding to black to a density corresponding to white, and
   wherein the reference decrease pattern is a density variation pattern of from the density corresponding to white to the density corresponding to black.

5. The image recognition apparatus of claim 3,
   wherein the reference increase pattern is a density variation pattern of from a density corresponding to black to a density corresponding to white via a density corresponding to gray, and
   wherein the reference decrease pattern is a density variation pattern of from the density corresponding to white to the density corresponding to black via the density corresponding to gray.

6. The image recognition apparatus of claim 3,
   wherein the reference increase pattern is a density variation pattern of from a density corresponding to black via a density corresponding to gray to a density corresponding to white, and
   wherein the reference decrease pattern is a density variation pattern of from a density corresponding to white to a density corresponding to black.

7. The image recognition apparatus of claim 3,
   wherein the reference increase pattern is a density variation pattern of from a density corresponding to black to a density corresponding to white, and
   wherein the reference decrease pattern is a density variation pattern of from the density corresponding to white to the density corresponding to black via the density corresponding to gray.

8. The image recognition apparatus of claim 3, wherein said road surface indication recognizing section is further operable to:
   determine a number of candidate portions that have a width smaller than or equal to the reference width and that are arranged consecutively in a direction approximately perpendicular to the reference direction, and
   when the number of the candidate portions is greater than or equal to a predetermined reference number, recognize that the candidate portions include parts of an image of a road surface indication in the at least one input image.

9. The image recognition apparatus of claim 8, wherein said road surface indication recognizing section is further operable to:
   judge whether an approximately band-like region that consists of the candidate portions that have a width smaller than or equal to the reference width and that are arranged consecutively in the direction approximately perpendicular to the reference direction in the predetermined number or more has an inclination that is within an allowable range that is predetermined based on an inclination of road surface indications in a displayed image of the road surface, and only when the inclination of the approximately band-like region is within the allowable range, recognize that the candidate portions constituting the approximately band-like region is a road surface indication.

10. The image recognition apparatus of claim 1, wherein said road surface indication recognizing section is further operable to search an entire area of the at least one input image for candidate portions for a road surface indication.

11. The image recognition apparatus of claim 1, wherein said road surface indication recognizing section is further operable to search, for candidate portions for a road surface indication, a prediction region of the at least one input image where a road surface indication is expected to exist.

12. The image recognition apparatus of claim 1, wherein said edge detecting section is further operable to:

judge, on a pixel basis, whether pixels in the first input image are located outside road surface indication portions therein, based on a road surface indication recognition result; and perform, only to each of pixels in the first input image that are located outside the road surface indication portions therein, a process for judging whether the pixel constitutes an edge in the first input image.

13. An image recognition apparatus comprising:

a first camera operable to shoot in a first visual field and to provide a first input image;

a second camera operable to shoot in a second visual field and to provide a second input image;

an edge detecting section operable to detect edges in the first input image that is supplied from said first camera;

a matching section operable to extract, as a reference pattern, a portion in the first input image that includes at least part of a detected edge and to conduct matching between the reference pattern and the second input image that is supplied from said second camera using a pattern matching method; and an object recognizing section operable to recognize an object in the first and second visual fields, based on a matching result, wherein said first and second cameras are provided so as to produce a parallax, wherein the first input image and the second input image each consist of a plurality of pixels, wherein said matching section is operable to conduct matching between the reference pattern and the second input image, using color densities of the respective pixels as indices, and wherein said matching section is further operable to correct, prior to the pattern matching, the densities of the respective pixels of at least one input image of the first input image and the second input image using an offset value commensurate with an individual, color-related difference between said first camera and said second camera.

14. The image recognition apparatus of claim 13, wherein said matching section is further operable to learn an individual, color-related difference between said first camera and said second camera, based on the first input image and the second input image.

15. An image recognition apparatus comprising:

a first camera operable to shoot in a first visual field and to provide a first input image;

a second camera operable to shoot in a second visual field and to provide a second input image;

an edge detecting section operable to detect edges in the first input image that is supplied from said first camera;

a matching section operable to extract, as a reference pattern, a portion in the first input image that includes at least part of a detected edge and to conduct matching between the reference pattern and the second input image that is supplied from said second camera using a pattern matching method; and an object recognizing section operable to recognize an object in the first and second visual fields, based on a matching result, wherein said first and second cameras are provided so as to produce a parallax, wherein the first input image and the second input image each consist of a plurality of pixels, wherein said matching section is further operable to conduct matching between the reference pattern and the second input image, using color density variation amounts of the pixels as indices, wherein said matching section is further operable to calculate a density difference between maximum and minimum densities of the pixels in the reference pattern and only when the calculated density difference is greater than or equal to a predetermined reference density difference, use the reference pattern for the pattern matching, and wherein the predetermined reference density difference is predetermined based on a minimum density difference of a reference pattern that enables effective matching.

16. An image recognition apparatus comprising:

a first camera operable to shoot in a first visual field and to provide a first input image;

a second camera operable to shoot in a second visual field and to provide a second input image;

an edge detecting section operable to detect edges in the first input image that is supplied from said first camera;

a matching section operable to extract, as a reference pattern, a portion in the first input image that includes at least part of a detected edge and to conduct matching between the reference pattern and the second input image that is supplied from said second camera using a pattern matching method; and an object recognizing section operable to recognize an object in the first and second visual fields, based on a matching result, wherein said first and second cameras are provided so as to produce a parallax, wherein said first camera and said second camera are disposed on a predetermined mounting axial line so as to be separated from each other by a predetermined distance, wherein in performing the pattern matching, said matching means section sets a search region as a subject of a process of the pattern matching in the second input image and compares, with a density distribution of the reference pattern, a density distribution of a portion in the second input image which portion includes at least one pixel of the search region and is congruous with the reference pattern, wherein a width of the search region in a direction that is perpendicular to a reference direction corresponding to a direction parallel with the mounting axial line in the second input image is greater than or equal to three pixels, and wherein a coordinate in the perpendicular direction of a center of the search region in the second input image is the same as a coordinate in the perpendicular direction of a center of the reference pattern in the first input image.

17. An image recognition apparatus comprising:

a first camera operable to shoot in a first visual field and to provide a first input image;

a second camera operable to shoot in a second visual field and to provide a second input image;

an edge detecting section operable to detect edges in the first input image that is supplied from said first camera;

a matching section operable to extract, as a reference pattern, a portion in the first input image that includes at least part of a detected edge and to conduct matching between the reference pattern and the second input image that is supplied from said second camera using a pattern matching method; and an object recognizing section operable to recognize an object in the first and second visual fields, based on a matching result, wherein said first and second cameras are provided so as to produce a parallax, wherein said first camera and said second camera are disposed on a predetermined mounting axial line so as to be separated from each other by a predetermined distance, wherein in performing the pattern matching, said matching section sets a search region as a subject of a process of the pattern matching in the second input image and compares, with a density distribution of the reference pattern, a density distribution of a portion in the second input image which portion includes at least one pixel of the search region and is congruous with the reference pattern, wherein a width of the search region in a reference direction corresponding to a direction parallel with the mounting axial line in the second input image is a width commensurate with an upper limit parallax that is determined based on an arrangement of said first camera and said second camera, and wherein a coordinate in the reference direction of a center of the search region in the second input image is deviated from a coordinate in the reference direction of a center of the reference pattern in the first input image in the same direction as a deviation corresponding to the parallax of the second input image with respect to the first input image.

18. An image recognition apparatus comprising:

a first camera operable to shoot in a first visual field and to provide a first input image;

a second camera operable to shoot in a second visual field and to provide a second input image;

an edge detecting section operable to detect edges in the first input image that is supplied from said first camera;

a matching section operable to extract, as a reference pattern, a portion in the first input image that includes at least part of a detected edge and to conduct matching between the reference pattern and the second input image that is supplied from said second camera using a pattern matching method; and an object recognizing section operable to recognize an object in the first and second visual fields, based on a matching result, wherein said first and second cameras are provided so as to produce a parallax, wherein in performing the pattern matching, said matching section:

selects, one by one, a plurality of detected edges in the first input image in order from an edge having highest edge intensity;

every time an edge is selected, sets, in the first input image, a reference pattern including at least part of the selected edge;

sets, in the second input image, a search region as a processing subject of the pattern matching, based on the position of the set reference pattern in the first input image and a matching result of a reference pattern that has already been processed and the second input image; and compares a density distribution of the set reference pattern and a density distribution of a portion in the second input image that includes at least one pixel of the search region and is congruous with the set reference pattern.

19. An image processing apparatus comprising:

a road surface image storing section operable to store an image of a road surface; and a road surface indication recognizing section operable to recognize a portion of a road surface indication in the road surface image, wherein the road surface indication recognizing section is further operable to:

divide the road surface image into a plurality of band-like regions extending in a reference direction corresponding to a direction parallel with the road in the image;

on the band-like region basis, search for a density variation pattern in the reference direction to determine as a candidate portion for a road surface indication, a portion having one end whose density increases according to a predetermined reference increase pattern and another end whose density decreases according to a predetermined reference decrease pattern, and compare a width of the searched candidate portion for a road surface indication with a predetermined reference width, and when the width of the searched candidate portion for a road surface indication is smaller than or equal to the reference width, recognize that the searched candidate portion is part of a road surface indication, and wherein the reference width is predetermined based on the width of a road surface indication that is closest to a camera that shot the road surface in an image of the road surface.

20. The image processing apparatus of claim 19, wherein said road surface image storing section is further operable to store a displayed image of the road surface, wherein said road surface indication recognizing section is further operable to recognize a displayed portion of the road surface indication in the road surface image, and wherein the reference width is predetermined based on the width of a road surface indication that is closest to a camera that shot the road surface in a displayed image of the road surface.

21. An image recognition apparatus comprising:

a first camera operable to shoot in a first visual field and to provide a first input image;

a second camera operable to shoot in a second visual field and to provide a second input image;

edge detecting means for detecting edges in the first input image that is supplied from said first camera;

matching means for extracting, as a reference pattern, a portion in the first input image that includes at least part of a detected edge and for conducting matching between the reference pattern and the second input image that is supplied from said second camera using a pattern matching method;

object recognizing means for recognizing an object in the first and second visual fields, based on a matching result; and a road surface indication recognizing means for recognizing road surface indications contained in at least one input image of the first input image and the second input image, wherein said first and second cameras are provided so as to produce a parallax, and wherein said edge detecting means detects remaining edges other than edges of the road surface indications among all the edges in the first input image, from the first input image, based on a road surface indication recognition result.

22. An image processing apparatus comprising:

road surface image storing means for storing a displayed image of a road surface; and road surface indication recognizing means for recognizing a displayed portion of a road surface indication in the road surface image, wherein the road surface indication recognizing means:

divides the road surface image into a plurality of band-like regions extending in a reference direction corresponding to a direction parallel with the road in the image;

on the band-like region basis, searches for a density variation pattern in the reference direction to determine as a candidate portion for a road surface indication, a portion having one end whose density increases according to a predetermined reference increase pattern and another end whose density decreases according to a predetermined reference decrease pattern, and compares a width of the searched candidate portion for a road surface indication with a predetermined reference width, and when the width of the searched candidate portion for a road surface indication is smaller than or equal to the reference width, recognizes that the searched candidate portion is part of a road surface indication, and wherein the reference width is predetermined based on the width of a road surface indication that is closest to a camera that shot the road surface in a displayed image of the road surface.

* * * * *